US012585338B2

(12) United States Patent
Stoops

(10) Patent No.: US 12,585,338 B2
(45) Date of Patent: **\*Mar. 24, 2026**

(54) KEYBOARD ASSEMBLY

(71) Applicant: Kevin R. Stoops, Bucyrus, KS (US)

(72) Inventor: Kevin R. Stoops, Bucyrus, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,515

(22) Filed: Jun. 24, 2024

(65) Prior Publication Data

US 2024/0345663 A1     Oct. 17, 2024

Related U.S. Application Data

(63) Continuation of application No. 18/109,143, filed on Feb. 13, 2023, now Pat. No. 12,019,810, which is a continuation of application No. 17/179,929, filed on Feb. 19, 2021, now Pat. No. 11,579,707, which is a continuation of application No. 16/779,800, filed on Feb. 3, 2020, now Pat. No. 10,936,087, which is a continuation-in-part of application No. 16/505,476, filed on Jul. 8, 2019, now Pat. No. 10,642,374, and a continuation-in-part of application No. 29/629,850, filed on Dec. 15, 2017, now Pat. No. Des. 874,250, and a continuation-in-part of application No.

(Continued)

(51) Int. Cl.
*G06F 3/02* (2006.01)
*H01H 13/702* (2006.01)

(52) U.S. Cl.
CPC .......... *G06F 3/0219* (2013.01); *G06F 3/0202* (2013.01); *H01H 13/702* (2013.01)

(58) Field of Classification Search
None
See application file for complete search history.

(56) References Cited

U.S. PATENT DOCUMENTS

| | | |
|---|---|---|
| 1,905,413 A | 4/1933 | Kramer |
| D168,455 S | 12/1952 | Johnson |
| | (Continued) | |

OTHER PUBLICATIONS

"'Aeons 1U Universal Server Shelf' Mar. 5, 2020, Amazon, site visited Dec. 1, 2023: https://www.amazon.com/Universal-Server-Vented-Cantilever-equipment/dp/B07XFS5J M B/ (Year: 2020)".

(Continued)

*Primary Examiner* — Xanthia C Relford
(74) *Attorney, Agent, or Firm* — Kutak Rock LLP

(57) ABSTRACT

A shelf bracket is provided. The shelf bracket includes a shelf member and opposing side flanges extending from a back plate. A front flange extends from each of said opposing side flanges. The back plate, shelf member, side flange, and front flange define a cavity configured to receive an enclosure, such as by moving the enclosure in a vertical direction in and out of engagement with the cavity. The shelf member defines a bottom limit of the cavity such that movement of the enclosure into the cavity is limited to a first vertical direction and movement of the enclosure out of the cavity is limited to a second vertical direction, the second vertical direction being diametrically opposed to the first vertical direction. A support flange is optionally included, which is configured to engage with a support structure so as to provide support for the shelf bracket.

20 Claims, 18 Drawing Sheets

Related U.S. Application Data

29/614,843, filed on Aug. 23, 2017, now Pat. No. Des. 892,597, said application No. 16/505,476 is a continuation of application No. 15/599,400, filed on May 18, 2017, now Pat. No. 10,345,920.

(60) Provisional application No. 62/508,048, filed on May 18, 2017, provisional application No. 62/338,428, filed on May 18, 2016.

(56) References Cited

U.S. PATENT DOCUMENTS

| | | | |
|---|---|---|---|
| D200,099 S | 1/1965 | Attwood | |
| D211,082 S | 5/1968 | La Londe | |
| D217,223 S | 4/1970 | Knohl | |
| D221,141 S | 7/1971 | Wormser | |
| 3,613,044 A | 10/1971 | Rarick | |
| 3,773,969 A | 11/1973 | Geisel | |
| 3,792,414 A | 2/1974 | Smith | |
| D244,817 S | 6/1977 | Schweitzer | |
| D260,758 S | 9/1981 | Borugian | |
| D260,852 S | 9/1981 | Loeschen | |
| D264,756 S | 6/1982 | Andersson | |
| 4,476,462 A | 10/1984 | Feldman | |
| 4,542,442 A * | 9/1985 | Drexler | H05K 7/18 |
| | | | 361/784 |
| D310,164 S | 8/1990 | Keel | |
| 4,948,281 A | 8/1990 | Werner | |
| D310,478 S | 9/1990 | Lang | |
| D321,293 S | 11/1991 | Kucsak | |
| 5,110,228 A | 5/1992 | Yokomizo | |
| 5,144,302 A | 9/1992 | Carter et al. | |
| 5,237,487 A | 8/1993 | Dittmer et al. | |
| D342,011 S | 12/1993 | Maguire | |
| 5,403,207 A | 4/1995 | Briones | |
| 5,653,079 A | 8/1997 | Loeffler et al. | |
| 5,982,357 A | 11/1999 | Burgett et al. | |
| D422,483 S | 4/2000 | Shea | |
| D438,448 S | 3/2001 | Batting et al. | |
| D442,705 S | 5/2001 | Eaton | |
| 6,259,044 B1 | 7/2001 | Paratore et al. | |
| D451,004 S | 11/2001 | Lewis | |
| 6,365,848 B1 | 4/2002 | Maple | |
| D472,793 S | 4/2003 | Callahan et al. | |
| 6,560,943 B1 | 5/2003 | Leek et al. | |
| 6,580,799 B1 | 6/2003 | Azima et al. | |
| D478,801 S | 8/2003 | Spruill | |
| 6,685,369 B2 | 2/2004 | Lien | |
| 6,686,908 B1 | 2/2004 | Kobayashi | |
| 6,705,787 B2 | 3/2004 | Jeffries et al. | |
| 6,727,890 B2 * | 4/2004 | Andres | G06F 3/0213 |
| | | | 345/156 |
| 6,765,158 B1 * | 7/2004 | Morrison | H01H 13/70 |
| | | | 200/341 |
| D507,665 S | 7/2005 | Ryan et al. | |
| D516,079 S | 2/2006 | Solomon et al. | |
| 7,012,206 B2 * | 3/2006 | Oikawa | H01H 13/063 |
| | | | 200/302.1 |
| 7,038,598 B2 | 5/2006 | Uke | |
| 7,091,955 B2 | 8/2006 | Kramer | |
| D540,396 S | 4/2007 | Kawanobe et al. | |
| 7,393,149 B2 * | 7/2008 | Galeev | G06F 3/0221 |
| | | | 400/489 |
| D574,222 S | 8/2008 | Golias, Jr. et al. | |
| D588,441 S | 3/2009 | Clarke | |
| D594,008 S | 6/2009 | Doczy et al. | |
| D606,384 S | 12/2009 | Antonic | |
| D613,745 S | 4/2010 | Arbisi et al. | |
| D615,848 S | 5/2010 | Prichard et al. | |
| D618,085 S | 6/2010 | Lin et al. | |
| D621,963 S | 8/2010 | Zadeh | |
| 7,787,912 B2 * | 8/2010 | Saila | H04M 1/0216 |
| | | | 455/90.3 |
| D644,339 S | 8/2011 | Sutton | |
| 7,997,770 B1 * | 8/2011 | Meurer | F21K 9/272 |
| | | | 362/555 |
| 8,046,032 B2 | 10/2011 | Babella | |
| D664,960 S * | 8/2012 | Stoops | D14/455 |
| D666,898 S | 9/2012 | Mcmahon | |
| D667,249 S | 9/2012 | London | |
| D689,760 S | 9/2013 | Chen | |
| D699,097 S | 2/2014 | Chung et al. | |
| 8,773,864 B2 * | 7/2014 | Rapp | H05K 7/1434 |
| | | | 361/752 |
| D724,418 S | 3/2015 | Fairchild | |
| 9,016,965 B1 | 4/2015 | Stoops et al. | |
| D730,080 S | 5/2015 | Henn | |
| D746,122 S | 12/2015 | Stoops | |
| D750,909 S | 3/2016 | Hickman | |
| D764,256 S | 8/2016 | Dedios-Shirley | |
| D765,492 S | 9/2016 | Akers | |
| D767,166 S | 9/2016 | Sparks | |
| D767,973 S | 10/2016 | Dedios-Shirley et al. | |
| D777,167 S | 1/2017 | Wengreen | |
| D779,312 S | 2/2017 | Stanley | |
| D782,289 S | 3/2017 | Darby et al. | |
| D789,564 S | 6/2017 | Lopez | |
| D789,565 S | 6/2017 | Lopez | |
| 9,706,025 B2 * | 7/2017 | Ikeda | H04M 1/0285 |
| D794,420 S | 8/2017 | Emmons | |
| D796,302 S | 9/2017 | Bright et al. | |
| D802,167 S | 11/2017 | Gyetvai | |
| D803,030 S | 11/2017 | Wengreen | |
| D820,664 S | 6/2018 | Allen et al. | |
| D820,665 S | 6/2018 | Dedios-Shirley et al. | |
| D821,851 S | 7/2018 | Stahl et al. | |
| D822,453 S | 7/2018 | Kanter | |
| D822,455 S | 7/2018 | Stahl et al. | |
| D823,095 S | 7/2018 | Stahl et al. | |
| D834,921 S | 12/2018 | Rose et al. | |
| D837,633 S | 1/2019 | Allen et al. | |
| D846,369 S | 4/2019 | Ni | |
| 10,345,920 B2 | 7/2019 | Stoops | |
| D855,439 S | 8/2019 | Schmonsees | |
| D855,440 S | 8/2019 | Schmonsees et al. | |
| D855,441 S | 8/2019 | Schmonsees et al. | |
| D856,117 S | 8/2019 | Homza et al. | |
| D863,040 S | 10/2019 | Dedios-Shirley et al. | |
| D865,487 S | 11/2019 | Dedios-Shirley | |
| 10,480,177 B2 * | 11/2019 | Siddhartha | E04B 1/388 |
| D874,250 S * | 2/2020 | Stoops | D8/355 |
| D878,095 S | 3/2020 | Dunahay | |
| 10,642,374 B2 | 5/2020 | Stoops | |
| D892,597 S | 8/2020 | Stoops | |
| D906,095 S | 12/2020 | Dedios-Shirley et al. | |
| 10,851,539 B2 | 12/2020 | Allen et al. | |
| 10,936,087 B2 | 3/2021 | Stoops | |
| D916,521 S | 4/2021 | Cao | |
| D931,711 S | 9/2021 | Sharma et al. | |
| D935,801 S | 11/2021 | Wang | |
| D948,991 S | 4/2022 | Stoops | |
| D956,893 S | 7/2022 | Tighe | |
| 11,579,707 B2 | 2/2023 | Stoops | |
| D993,749 S | 8/2023 | Newman | |
| D994,465 S | 8/2023 | Gilstrap | |
| 12,019,810 B2 | 6/2024 | Stoops | |
| 2003/0044000 A1 | 3/2003 | Kfoury et al. | |
| 2003/0078014 A1 | 4/2003 | Salminen et al. | |
| 2003/0108374 A1 * | 6/2003 | Lien | G06F 3/0202 |
| | | | 400/472 |
| 2004/0013456 A1 | 1/2004 | Hochgesang et al. | |
| 2004/0136167 A1 * | 7/2004 | Sullivan | G06F 1/1632 |
| | | | 361/728 |
| 2004/0207976 A1 * | 10/2004 | Hamada | G06F 1/1662 |
| | | | 361/679.08 |
| 2005/0083307 A1 | 4/2005 | Aufderheide et al. | |
| 2006/0159506 A1 | 7/2006 | Cheng et al. | |
| 2007/0041770 A1 * | 2/2007 | Galeev | G06F 3/0219 |
| | | | 400/472 |
| 2007/0099675 A1 | 5/2007 | Silverbrook | |
| 2007/0235309 A1 | 10/2007 | Tsu | |
| 2007/0290889 A1 | 12/2007 | Wiley | |
| 2008/0085142 A1 | 4/2008 | Caveney et al. | |

(56)         References Cited

U.S. PATENT DOCUMENTS

| | | | |
|---|---|---|---|
| 2008/0297994 A1 | 12/2008 | Shi | |
| 2008/0309633 A1 | 12/2008 | Hotelling et al. | |
| 2009/0167287 A1 | 7/2009 | Van Meijl et al. | |
| 2009/0174994 A1* | 7/2009 | Merz | G06F 1/1624 |
| | | | 361/679.09 |
| 2010/0146903 A1 | 6/2010 | Ellis | |
| 2010/0253552 A1 | 10/2010 | Lanceros et al. | |
| 2010/0302168 A1* | 12/2010 | Giancarlo | G06F 3/0393 |
| | | | 345/169 |
| 2011/0017524 A1 | 1/2011 | Chen et al. | |
| 2011/0095918 A1 | 4/2011 | Kim et al. | |
| 2011/0203913 A1* | 8/2011 | Chen | H01H 13/702 |
| | | | 29/592.1 |
| 2012/0032821 A1* | 2/2012 | Senatori | G06F 3/0202 |
| | | | 341/22 |
| 2012/0050076 A1* | 3/2012 | Ku | H01H 13/86 |
| | | | 341/22 |
| 2012/0111173 A1* | 5/2012 | Bowen | G06F 3/0221 |
| | | | 84/170 |
| 2012/0113013 A1* | 5/2012 | Lee | G06F 3/0202 |
| | | | 345/170 |
| 2015/0077330 A1* | 3/2015 | Okabe | G06F 3/023 |
| | | | 345/156 |
| 2015/0211688 A1* | 7/2015 | Shan | F21K 9/27 |
| | | | 362/221 |
| 2015/0220161 A1* | 8/2015 | Ryabchenko | G06F 3/0219 |
| | | | 345/169 |
| 2015/0264823 A1 | 9/2015 | Shirley et al. | |
| 2015/0290965 A1 | 10/2015 | Schwartz | |
| 2016/0002912 A1 | 1/2016 | Doupe et al. | |
| 2016/0378199 A1* | 12/2016 | Sizelove | G06F 3/0202 |
| | | | 235/449 |
| 2017/0108180 A1* | 4/2017 | Lee | F21K 9/27 |
| 2017/0191254 A1 | 7/2017 | Daudet | |
| 2017/0336875 A1 | 11/2017 | Stoops | |
| 2018/0068811 A1* | 3/2018 | Ligtenberg | H01H 13/86 |
| 2018/0202144 A1 | 7/2018 | Allen et al. | |
| 2019/0332187 A1 | 10/2019 | Stoops | |
| 2020/0174578 A1 | 6/2020 | Stoops | |
| 2021/0173492 A1 | 6/2021 | Stoops | |
| 2023/0273686 A1 | 8/2023 | Stoops | |

OTHER PUBLICATIONS

"'NavePoint Cantilever Server Shelf' Jul. 16, 2012, Amazon, site visited Dec. 1, 2023: https://www.amazon.com/dp/ B008LUW4HS/ (Year: 2012)".

"'NavePoint Rack Mount Keyboard Shelf' Apr. 28, 2014, Amazon, site visited Dec. 1, 2023: https://www.amazon.com/NavePoint-Mount-Keyboard-Shelf-Shelves/dp/B00XXDMA5E/ (Year: 2014)".

"'Quest Manufacturing Keyboard Shelf' Aug. 4, 2017, Amazon, site visited Dec. 1, 2023: https://www.amazon.com/ Quest-Manufacturing-Keyboard-Reversible-ES1019-0108/dp/B074P5KY6T/ (Year: 2017)".

"Ex Parte Quayle Action Received for US Design U.S. Appl. No. 29/984,013, Mailed on Nov. 14, 2025".

* cited by examiner

KEYBOARD ASSEMBLY

CROSS-REFERENCE TO RELATED APPLICATIONS

This application is a continuation application of U.S. patent application Ser. No. 18/109,143, now U.S. Pat. No. 12,019,810, filed Feb. 13, 2023, which in turn is a continuation of U.S. patent application Ser. No. 17/179,929, now U.S. Pat. No. 11,579,707, filed Feb. 19, 2021, for KEYBOARD ASSEMBLY, which claims priority to:

U.S. patent application Ser. No. 16/779,800, now U.S. Pat. No. 10,936,087, filed Feb. 3, 2020, for KEYBOARD ASSEMBLY, which claims priority to U.S. patent application Ser. No. 16/505,476, now U.S. Pat. No. 10,642,374 B2, filed Jul. 8, 2019, for KEYBOARD/KEYBOARD ENCLOSURE, which claims priority to U.S. patent application Ser. No. 15/599,400, now U.S. Pat. No. 10,345,920, filed May 18, 2017, which claims priority to U.S. Provisional Patent Application Ser. No. 62/508,048, filed May 18, 2017, and U.S. Provisional Patent Application Ser. No. 62/338, 428, filed May 18, 2016;

U.S. Design patent application Ser. No. 29/614,843, filed Aug. 23, 2017, for BUMP BAR/KEYPAD SHELF BRACKET; and U.S. Design patent application Ser. No. 29/629,850, filed Dec. 15, 2017, for EXPANDABLE BRACKET, now U.S. Design Pat. No. D874,250, the entire disclosures of which are incorporated herein by reference.

FIELD OF THE INVENTION

The present invention relates generally to computer user interfaces. More specifically, the present invention relates to a keyboard/keyboard assembly that is particularly well-suited for use in quick serve restaurant environments.

BACKGROUND

Quick serve restaurants utilize many computers for purposes such as inputting orders at a counter and/or completing food orders in a kitchen. Many of the computers include a PS/2, serial, USB or other similar style input interface. The input interface (keyboard) typically includes a small number of keys (compared to a QWERTY keyboard) that includes letters, numbers, symbols or words associated with certain functions of the computer (i.e. inputting a customer's order, inputting completion of the order by a kitchen staff person, etc.). As commercial kitchen environments are typically extremely harsh due to high temperatures, corrosive substances (foods, liquids, etc.), employee usage/abuse, etc., the computer input interface devices are subjected to significant wear and tear.

Many of the input interface devices of the prior art typically includes a two-piece metal enclosure shell (front shell half and rear shell half) for a printed circuit board (PCB). The printed circuit board includes connectors for a PS/2 cable that connects to a computer, and for a ribbon cable that connects to a keypad membrane that is mounted to the outer surface of the enclosure. The PS/2 cable extends through a slot in the enclosure and is connected to the computer. Installing (or reinstalling/replacing) the PS/2 cable includes disassembling the two halves of the enclosure shell and inserting the cable into the slot in the side of one of the halves of the shell. Due to the design of such prior art metal enclosures, this is a time consuming process, and can result in damage to the PCB. To overcome disadvantages with the prior art metal enclosures, the instant inventor developed the enclosure of U.S. Pat. No. 9,016,965 (the "'965 Patent"), the entire disclosure of which is incorporated herein by reference. The enclosure of embodiments of the '965 Patent includes a front shell portion and a rear shell portion, each made of nylon 6. While the enclosure of the '965 Patent provides many advantages to the metal enclosures of the prior art, many restaurants still prefer a metal enclosure, due to a perception that metal is more durable than nylon.

Therefore, it is desirable to provide a keyboard assembly having a metal enclosure that is easy to assemble/disassemble.

Additionally, many restaurants commonly keep keyboard and similar input devices (each a "keyboard") close to the working surfaces of respective workstations. Many times, the keyboards have but a few optimal locations (and maybe only a single optimal location) relative to a respective workstation. If such keyboards cannot be located in such optimal location(s), they must be located in sub-optimal locations—such as locations where customers can view the keyboard (oftentimes not a part of the overall store dress) or in locations where they cannot accommodate certain workstation or work floor configurations. Furthermore, it is often required or desirable to move or relocate a keyboard, such as during a peak or non-peak times, when new product offerings are introduced (which can be relatively common in certain quick-serve restaurants), when reconfiguration of workstations is required or desired, and/or the like. Present keyboard assemblies are limited in their configurability and reconfigurability to address such situations.

Accordingly, there is a need for a mounting system, such as a bracket, that provides for versatility in mounting locations for keyboards. Furthermore, it would be beneficial to have a keyboard assembly that was easily configurable and reconfigurable to address changing requirements and recommendations.

SUMMARY

Improved Enclosure

The instant invention provides a keyboard assembly having an enclosure, such as a metal enclosure that is easy to assemble/disassemble. In some embodiments, the enclosure includes a front metal member and a back metal member that slide-fit together via an interlocking tongue and groove structure. In some embodiments, the metal front and back are made of aluminum. End caps are located on each end of the joined front and back members to complete the enclosure. In some embodiments, the end caps are made of a nylon or other non-metal material. In some embodiments, the end caps include a knock-out area to allow a ribbon cable for a keypad membrane that is positioned on the exterior surface of the metal front to be extended through the end cap into an interior of the enclosure, thereby facilitating digital communication with a PCB located within the enclosure. In some embodiments, the end cap includes receiver structure to support the PCB located within the enclosure.

In some embodiments of the inventive concept, the keypad can be programmed with "macros" that are stored on the PCB. In this manner, an app on a computer or other device is utilized to program the macros. The keypad is connected to the computer and instructions are uploaded to the keypad to store a series of characters that are stored in connection with each key. In this manner, once the keypad is programmed and connected to a computer for use, when a user presses a key the series of characters stored on the PCB will be sent from the keypad to the computer to which it is connected.

Mounting System—Shelf Bracket

In some embodiments, the keyboard assembly includes a shelf bracket for supporting one or more enclosure of the present invention and/or the prior art. In some embodiments, the bracket includes a first shelf member for providing vertical support and a mounting element for securing the shelf bracket to a support structure. In some embodiments, the shelf bracket includes a plurality of flanges for preventing or otherwise inhibiting lateral movement of the enclosure relative to the shelf member.

Mounting System—Expandable Bracket

In some embodiments, the keyboard assembly includes an expandable bracket that is configured to selectively engage with an enclosure, such as the enclosures of U.S. Pat. No. 10,345,920.

The Expandable Bracket of the present invention is configured to secure a keyboard enclosure in position relative to a wall or other structure, thereby providing a support structure for the keyboard enclosure. In some embodiments, a mounting element defines a plurality of apertures for securing the Expandable Bracket to the wall or other structure with a screw or other fastening means. It will be appreciated that in other embodiments the expandable bracket is secured to the wall or other structure using one or more other means now known or later developed.

The expandable bracket includes opposed legs having opposed proximal and distal ends, the proximal end of each leg being coupled to respective opposed edges of the back plate of the Expandable Bracket such that the back plate and the opposed legs, together, define a channel. In some embodiments, the expandable bracket is moveable between a relaxed configuration and an expanded configuration, thereby facilitating movement of the keyboard assembly between an unsecured configuration and a secured configuration, respectively, when the enclosure is in an engaged configuration relative to the expandable bracket. In some embodiments, the expandable bracket prevents or otherwise inhibits the enclosure from moving away from the engaged configuration when the keyboard assembly is in the secured configuration. In some embodiments, moving the keyboard assembly to the unsecured configuration facilitates movement of the enclosure between the engaged configuration and a disengaged configuration, the enclosure being capable of being moved away from the expandable bracket when it is in the disengaged configuration. In some embodiments, the expandable bracket is part of an expandable bracket assembly comprising a biasing assembly having a biasing member that is moveable between a retracted configuration and a deployed configuration associated with the relaxed configuration and the expanded configuration of the bracket, respectively. In some embodiments, the expandable bracket is moveable between the relaxed configuration and a compressed configuration, such as by applying a biasing load on one or more leg of the bracket so as to move the legs towards each other, thereby facilitating movement of the enclosure between the engaged and disengaged configurations.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

Improved Enclosure

Mounting System—Shelf Bracket

Figure 14:
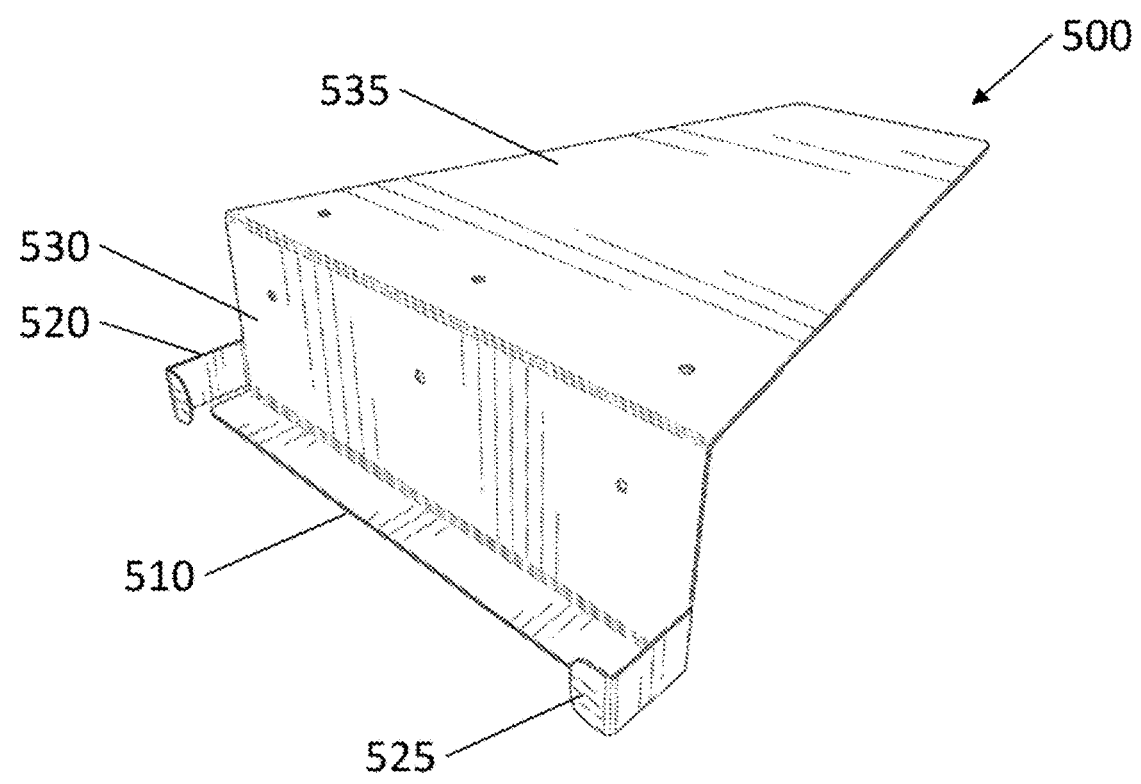

FIG. 14 is a perspective view showing a first embodiment of a shelf bracket of the present invention.

Figure 15:
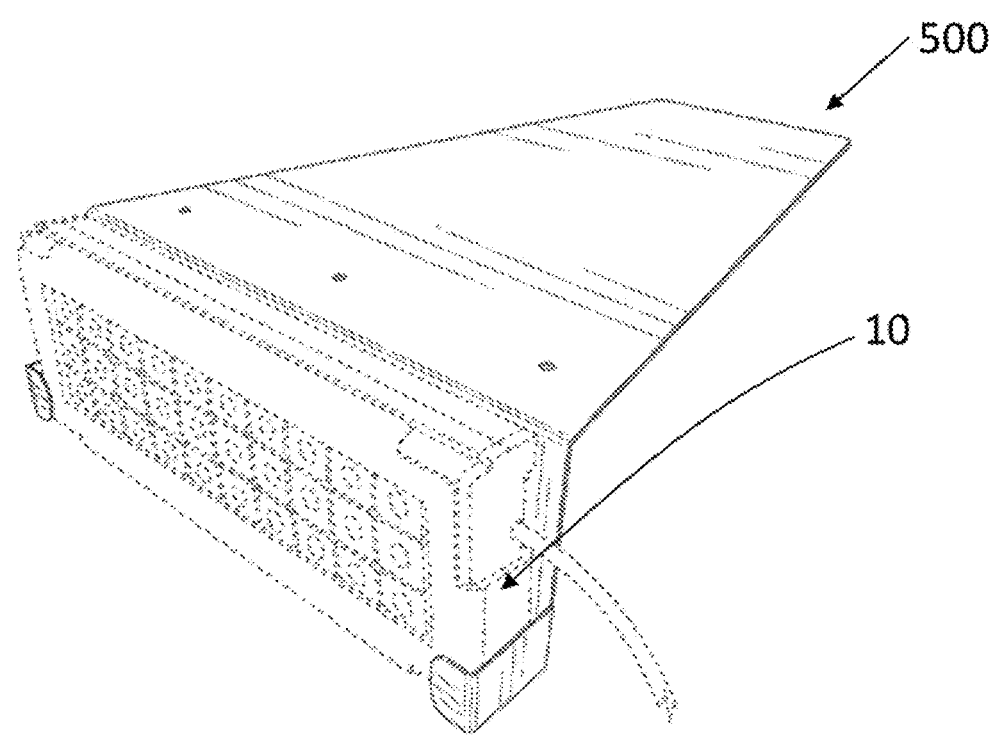

FIG. 15 is a perspective view showing an enclosure engaged with the shelf bracket of FIG. 14.

Figure 16:
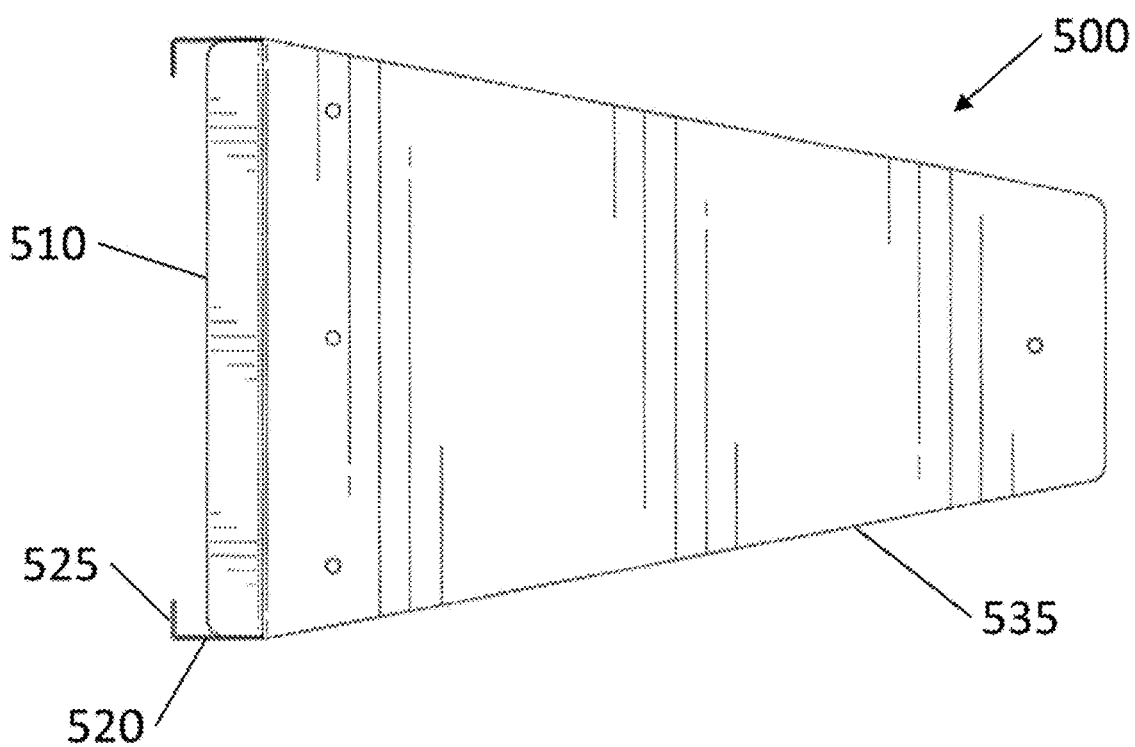

FIG. 16 is a top view of the bracket of FIG. 14.

Figure 17:
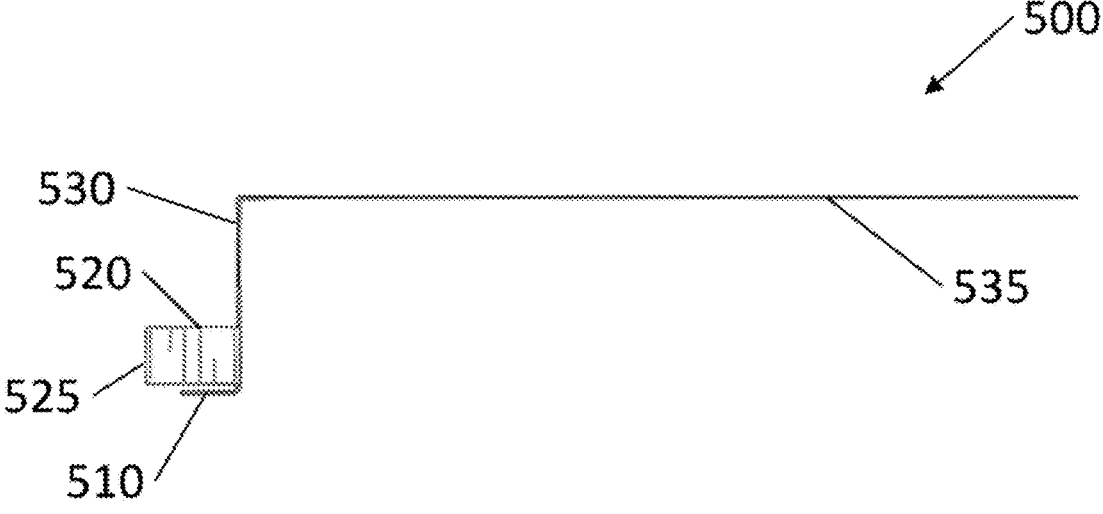

FIG. 17 is a side elevation view of the bracket of FIG. 14.

Figure 18A:
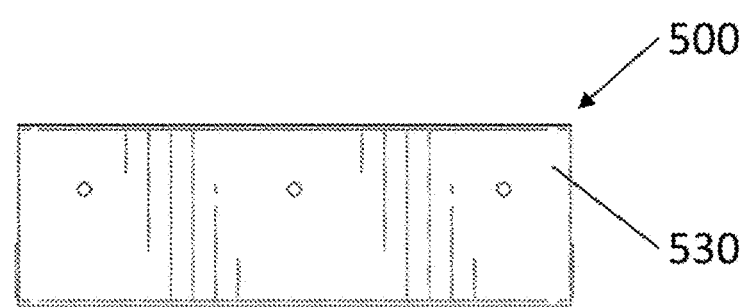

FIG. 18A is a rear elevation view of the bracket of FIG. 14

Figure 18B:
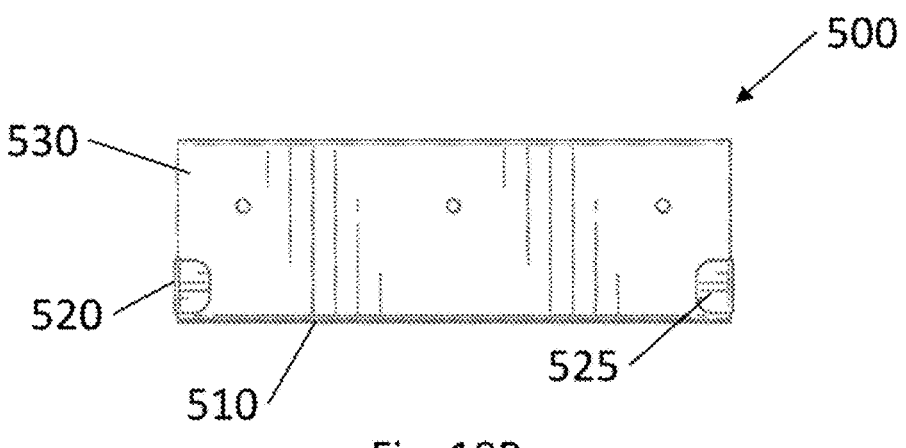

FIG. 18B is a front elevation view of the bracket of FIG. 14.

Figure 19:
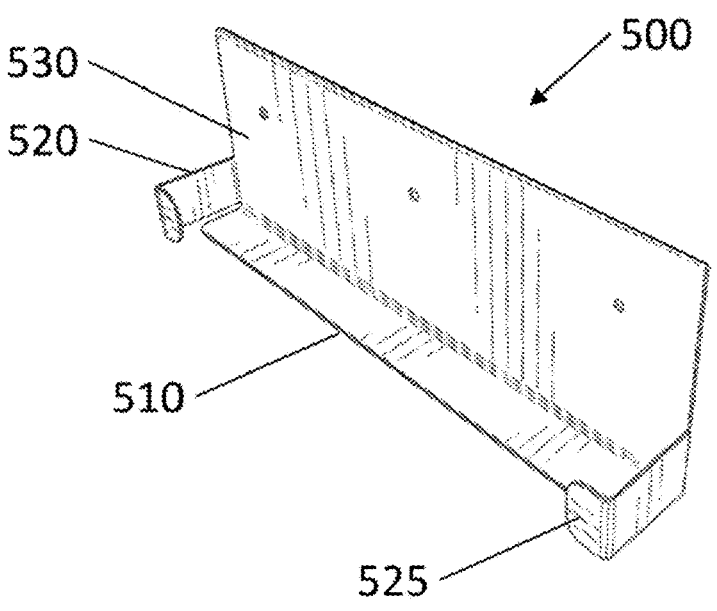

FIG. 19 is a perspective view showing a second embodiment of a shelf bracket of the present invention.

Mounting System—Expandable Bracket

Figure 20:
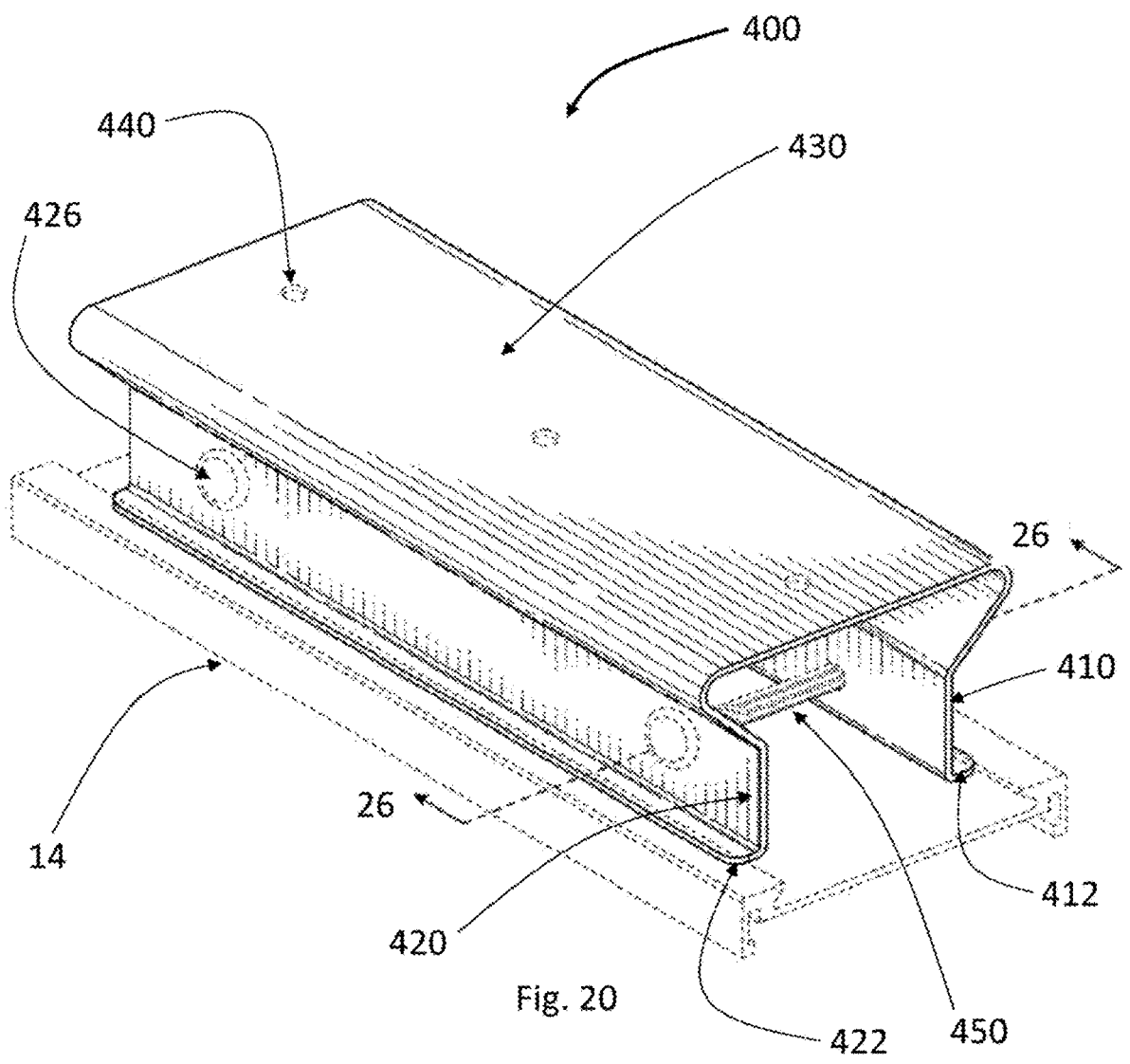

FIG. 20 is a perspective view of a first embodiment of an expandable bracket assembly of a keyboard assembly of the present invention, a bracket of the bracket assembly shown engaged with a back plate of an enclosure of the keyboard assembly, the back plate being shown in a translucent state so as to show certain features associated with the keyboard assembly being in a secured configuration.

Figures 21, 22, 23:
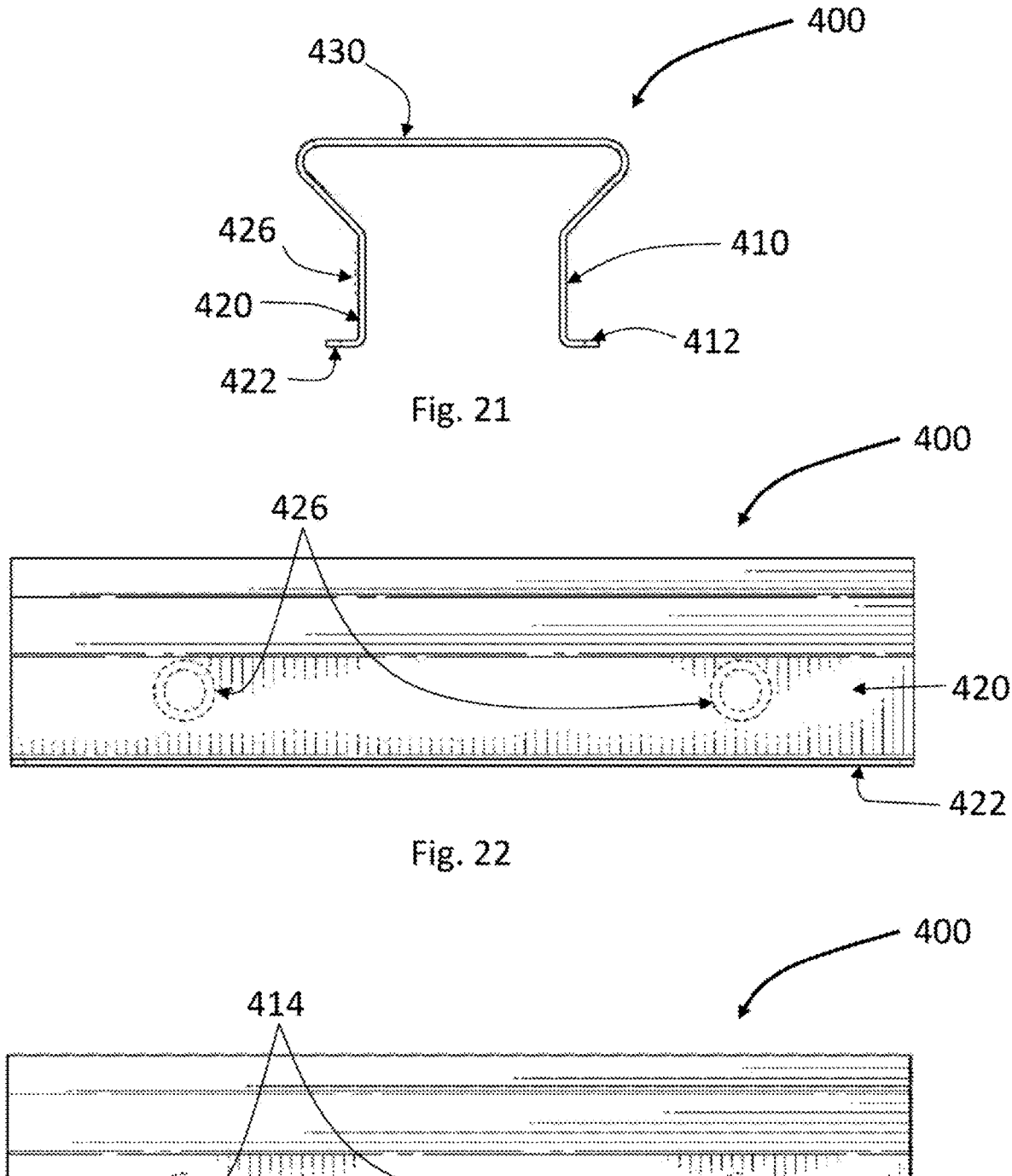

FIG. 21 is a front view of the bracket of FIG. 20, the rear view being a mirror image thereof.

FIG. 22 is a side elevation view of a first side of the bracket of FIG. 20.

FIG. 23 is a side elevation view of a second side of the bracket of FIG. 20.

Figure 24:
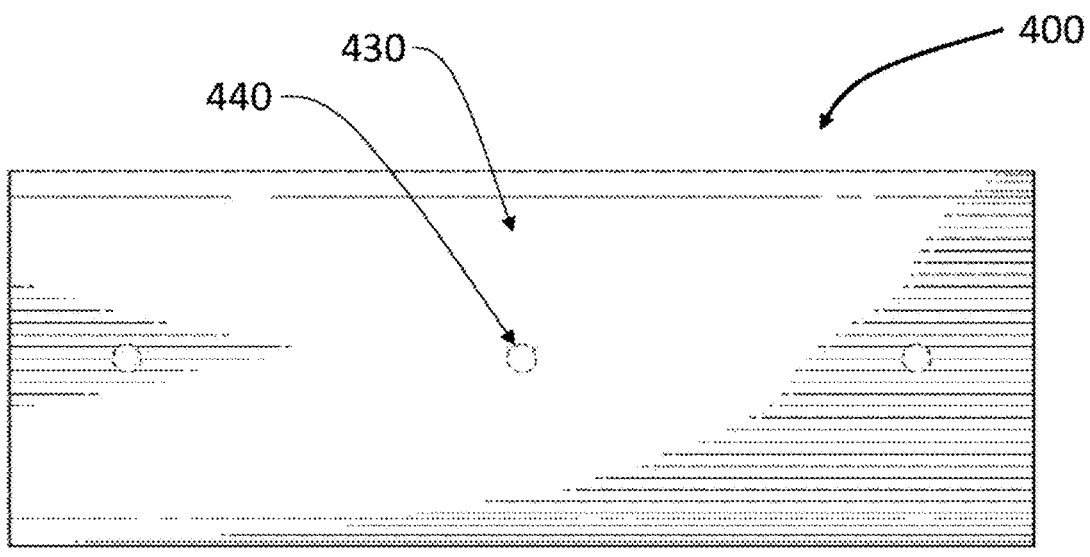

FIG. 24 is a top plan view of the bracket of FIG. 20.

Figure 25:
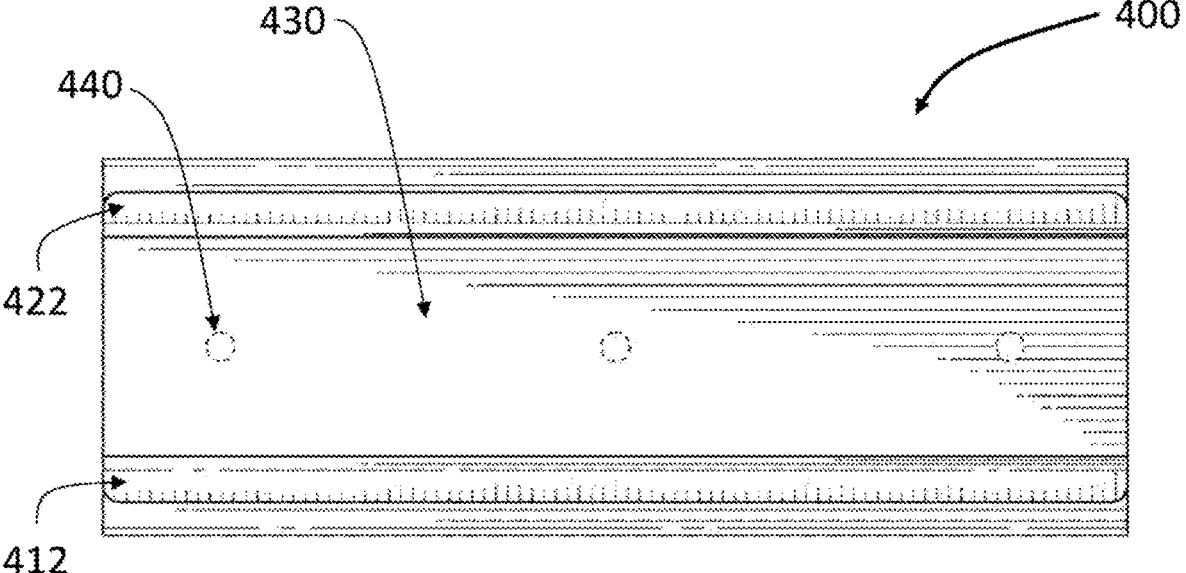

FIG. 25 is a bottom plan view of the bracket of FIG. 20.

Figure 26:
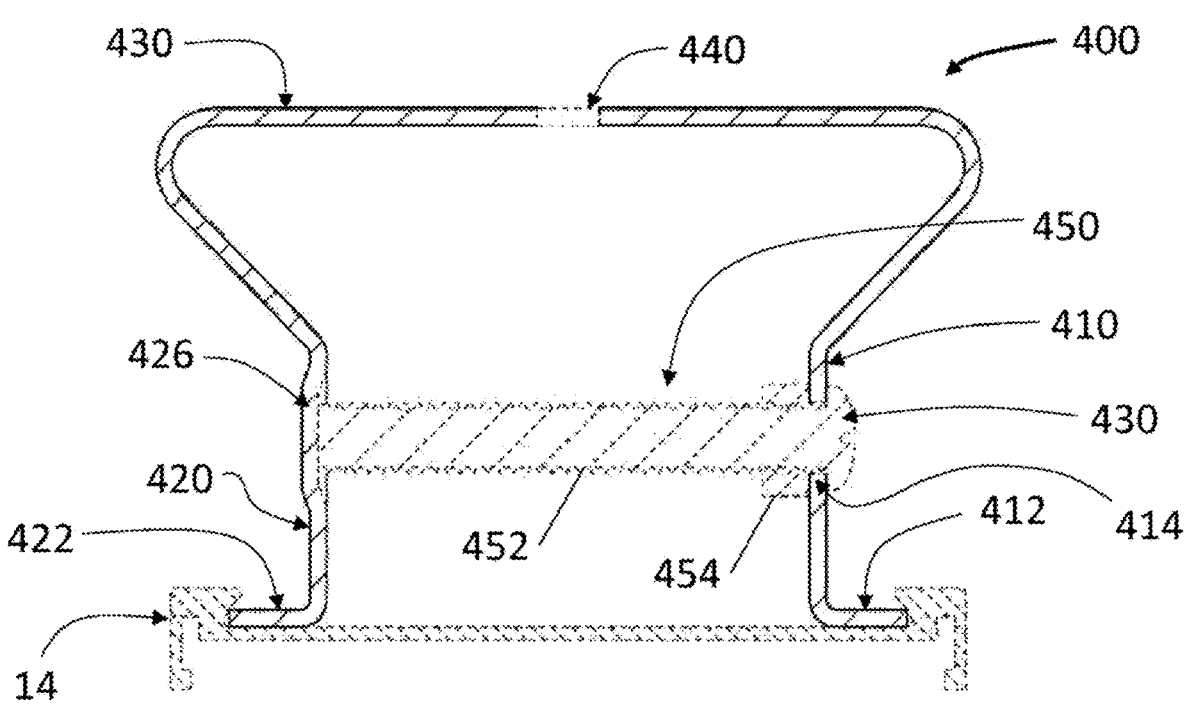

FIG. 26 is a sectional view taken from FIG. 20, a biasing member of the bracket assembly shown in a deployed configuration and the bracket shown in an expanded configuration.

Figure 27:
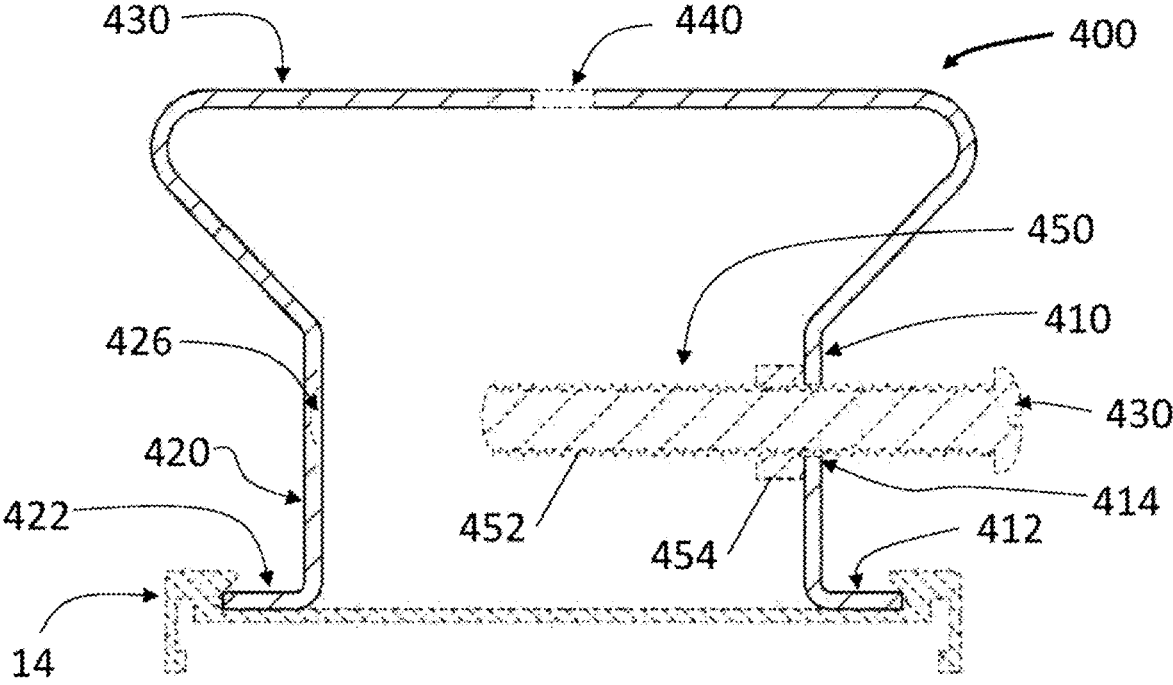

FIG. 27 is a sectional view similar to the sectional view of FIG. 26, the biasing member shown in a retracted configuration and the bracket shown in a relaxed configuration.

Figure 28:
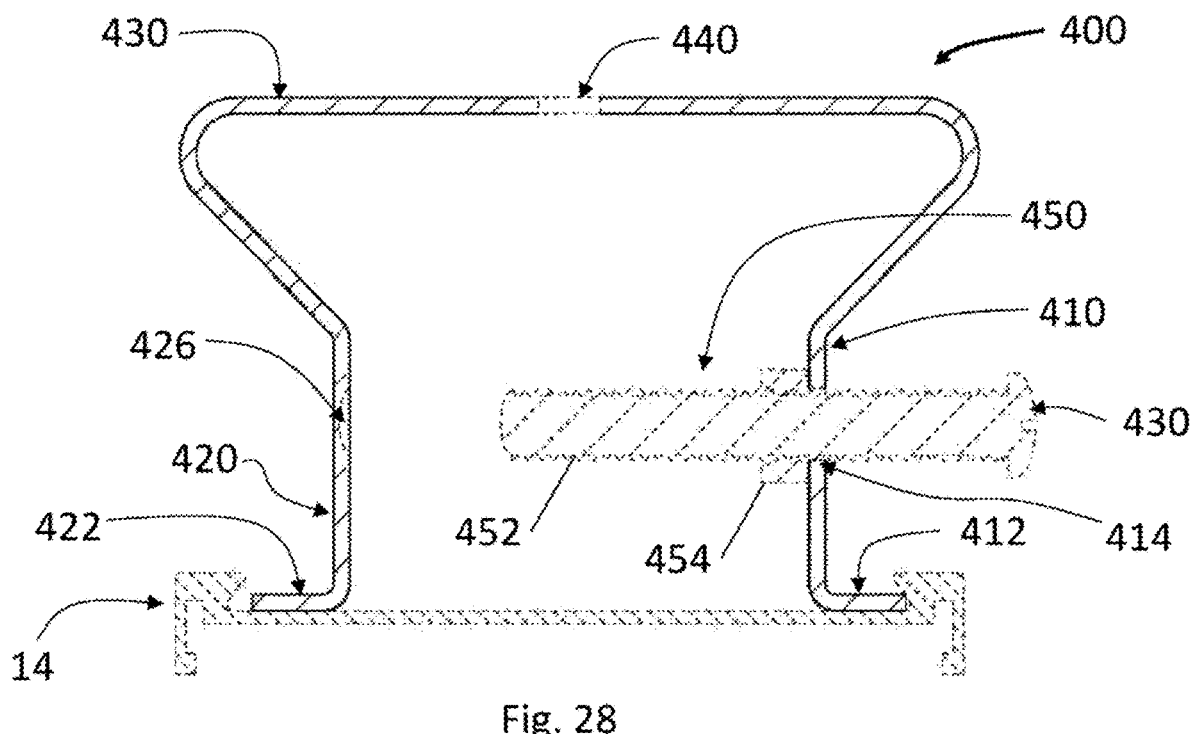

FIG. 28 is a sectional view similar to the sectional view of FIG. 26, the biasing member shown in a retracted configuration and the bracket shown in a compressed configuration.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Keyboard/Keyboard Enclosure

Referring to FIGS. 1 through 7 a keyboard enclosure 10 of a first embodiment of the instant invention is shown. The keyboard enclosure of the first embodiment includes a front shell portion 12 and a rear shell portion 14, each of which is preferably made of a lightweight, durable material, such as aluminum.

The front 12 and rear 14 shells are configured for selective engagement with each other, thereby defining a cavity 200 for holding one or more PCB 20. In some embodiments, the keyboard enclosure 10 further includes one or more end cap 300, such as a common end cap, a cable end cap, a battery end cap, or the like. In some embodiments, a first end cap 300 is configured to selectively engage with a first end of the keyboard enclosure 10, thereby selectively enclosing the one or more PCB within the cavity 200.

In some embodiments a profile of a first end of the front shell 12 defines at least part of a pass-through slot 15 for a ribbon cable 32 of a keypad 30 to extend. In some such embodiments, a first edge of the pass-through slot is defined by the front shell and an opposed second edge of the pass-through slot is defined by an end cap 300. In this way, the ribbon cable 32 is secured within the pass-through slot 15 when the end cap is secured to the front shell 12 and can be readily moved into and out of the pass-through slot 15 when the end cap is disengaged from the front shell 12. In some embodiments, at least part of the pass-through slot 15 is defined by the end cap 300. In this way, more or less clearance for one or more ribbon can be provided by replacing a first end cap with a second end cap.

In some embodiments, the front shell 12, the back shell 14, and/or one or more end cap defines one or more speaker hole 17 extending into the cavity 200 of the keyboard enclosure 10. In this way, sound is allowed to pass through the speaker holes 17 from a speaker mounted to the PCB 20 or otherwise located within the interior cavity 200 of the keyboard enclosure 10.

The PCB 20 is configured to selectively engage with the first shell 12, the second shell 14, and/or one or more end cap 300 so as secure the PCB within the cavity 200 of the keyboard enclosure 10. In some embodiments, the first shell 12 defines opposed longitudinal slots for selective engagement with opposed longitudinal edges of the PCB 20. In this way, the PCB 20 is capable of selective engagement with the first shell 12 by inserting first ends of the opposed edges of the PCB into respective slots of the front shell 12 and sliding the PCB 20 longitudinally relative to the first shell 12. In some such embodiments, one or more indexing feature 121 of the enclosure 10 provides an indication of when the PCB 20 is moved into a proper position. In other such embodiments, one or more feature of the enclosure, such as one or more feature of an end cap 300, is configured to selectively retain the PCB at one or more position.

Figure 1:
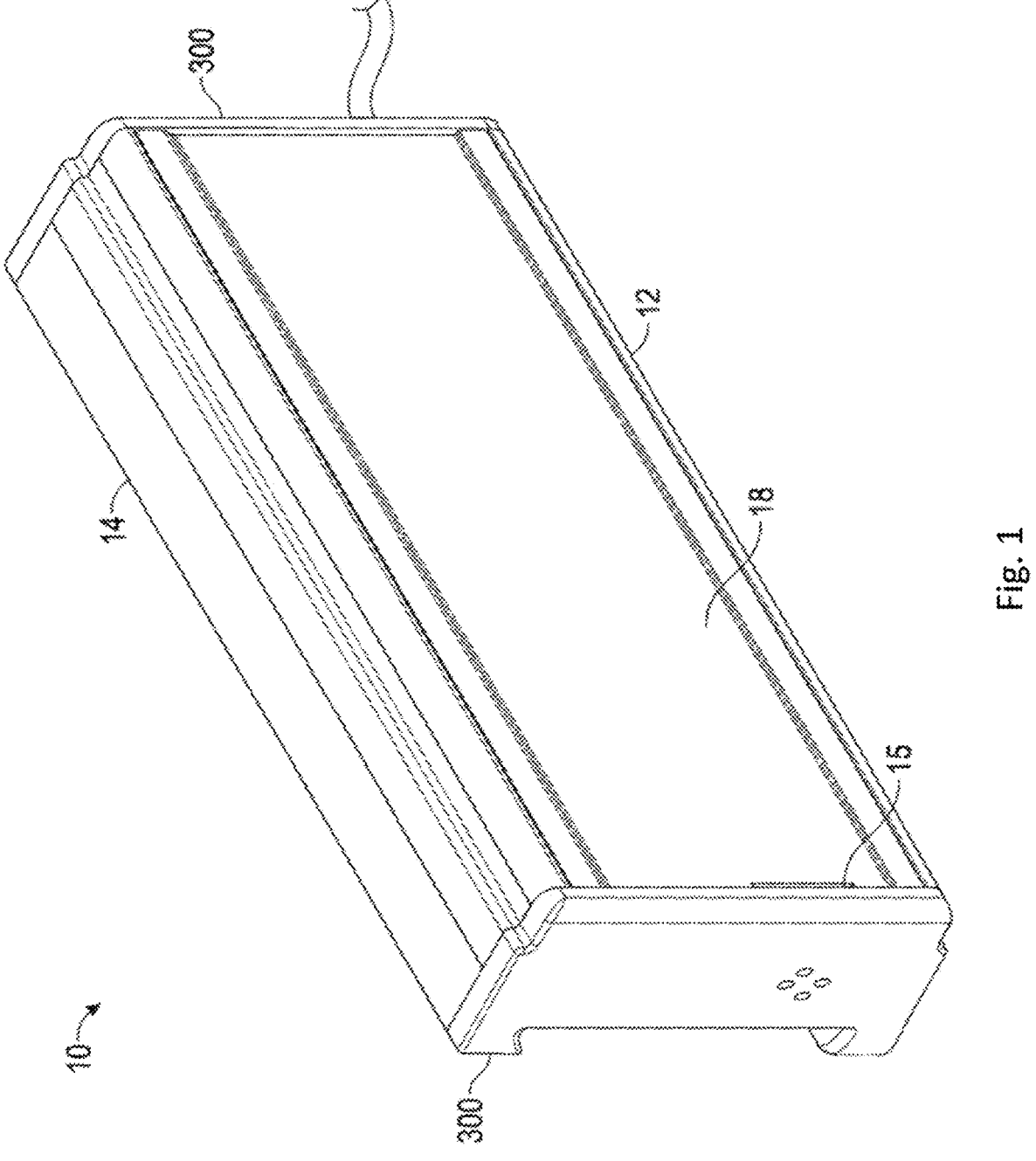
FIG. 1 is a front isometric view of a keyboard enclosure of an embodiment of the present invention.
Figure 2:
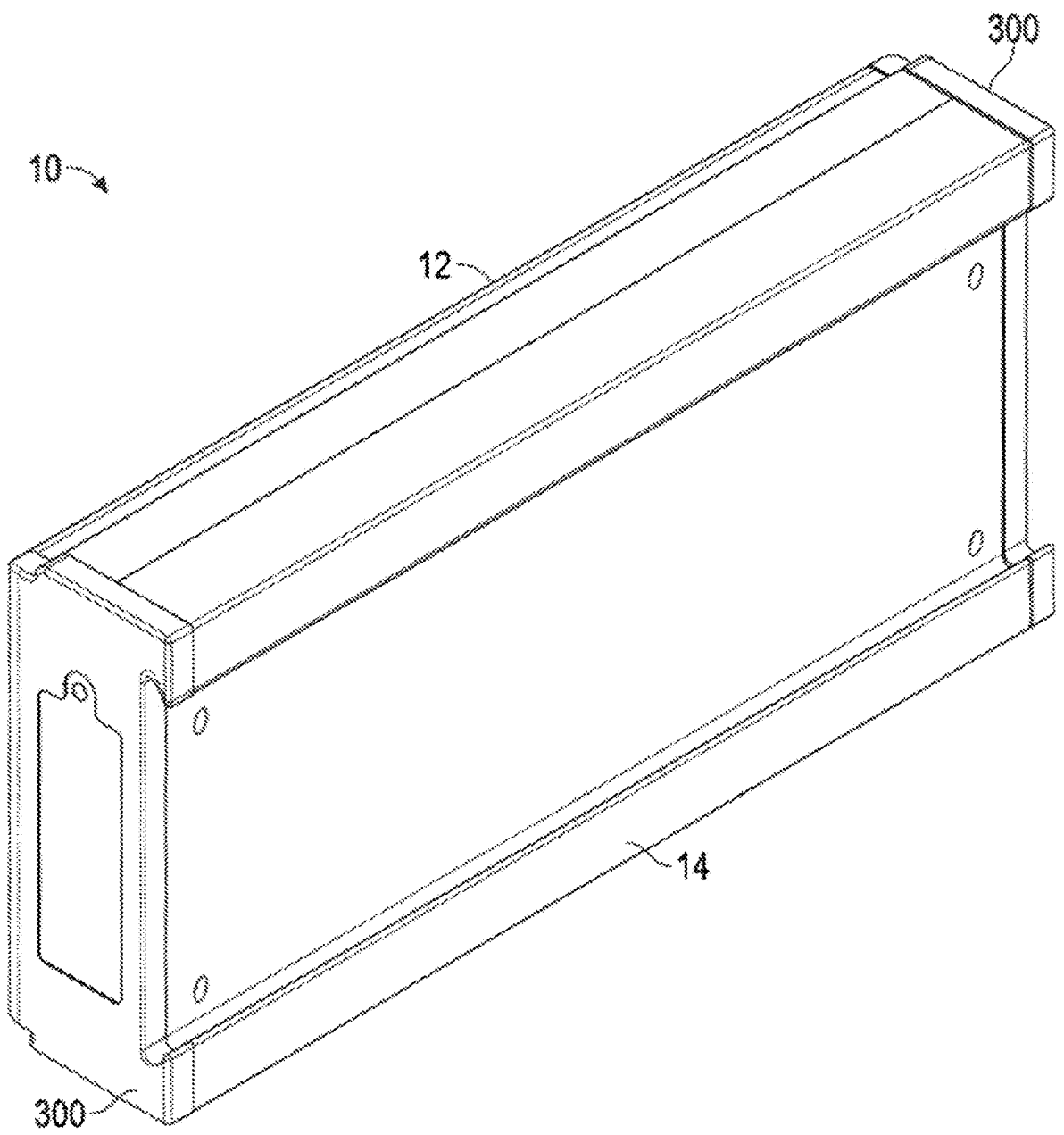
FIG. 2 is a rear isometric view of a keyboard enclosure of an embodiment of the present invention.
Figure 3:
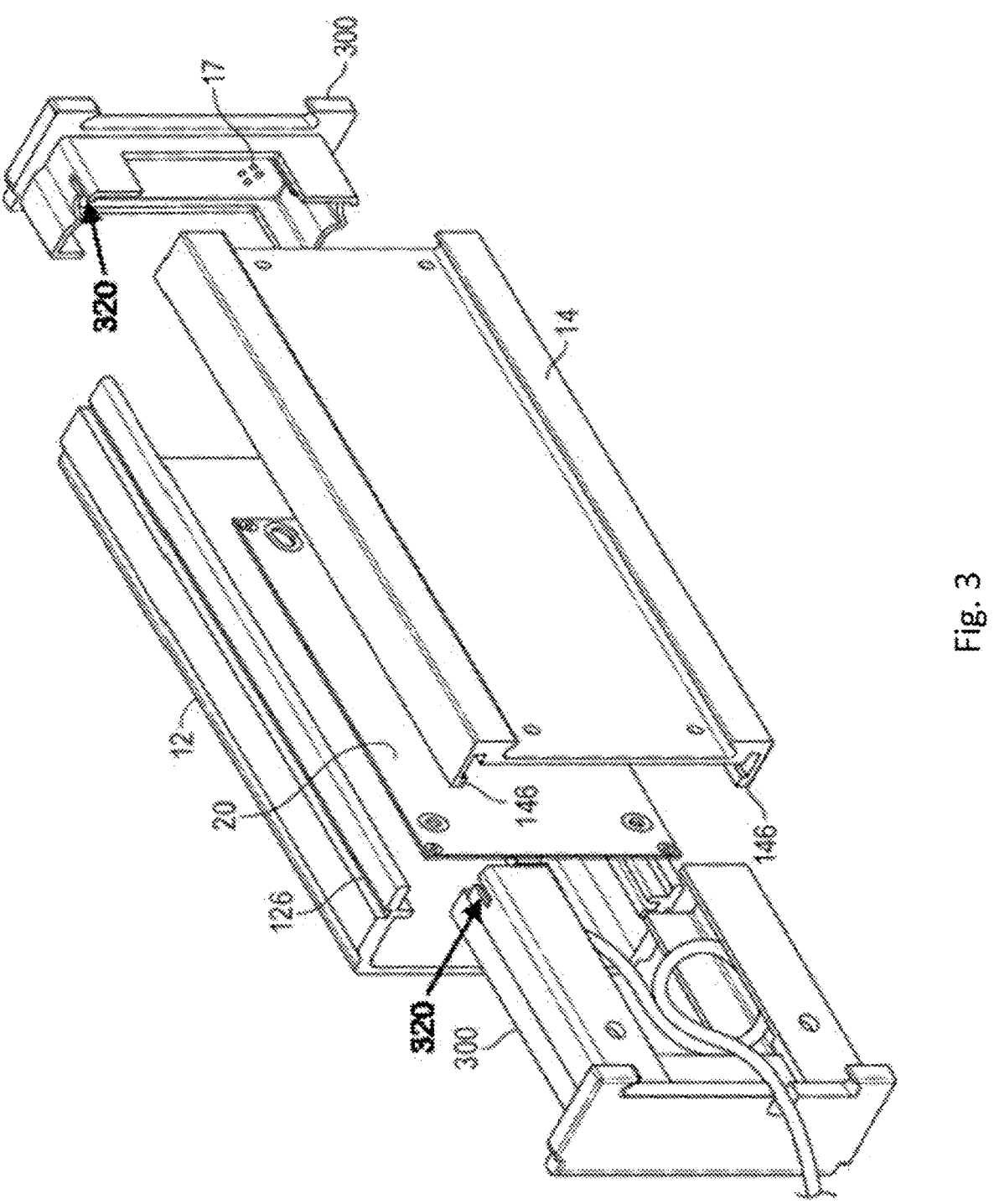
FIG. 3 is an exploded rear perspective view of an embodiment of the present invention.
Figure 4:
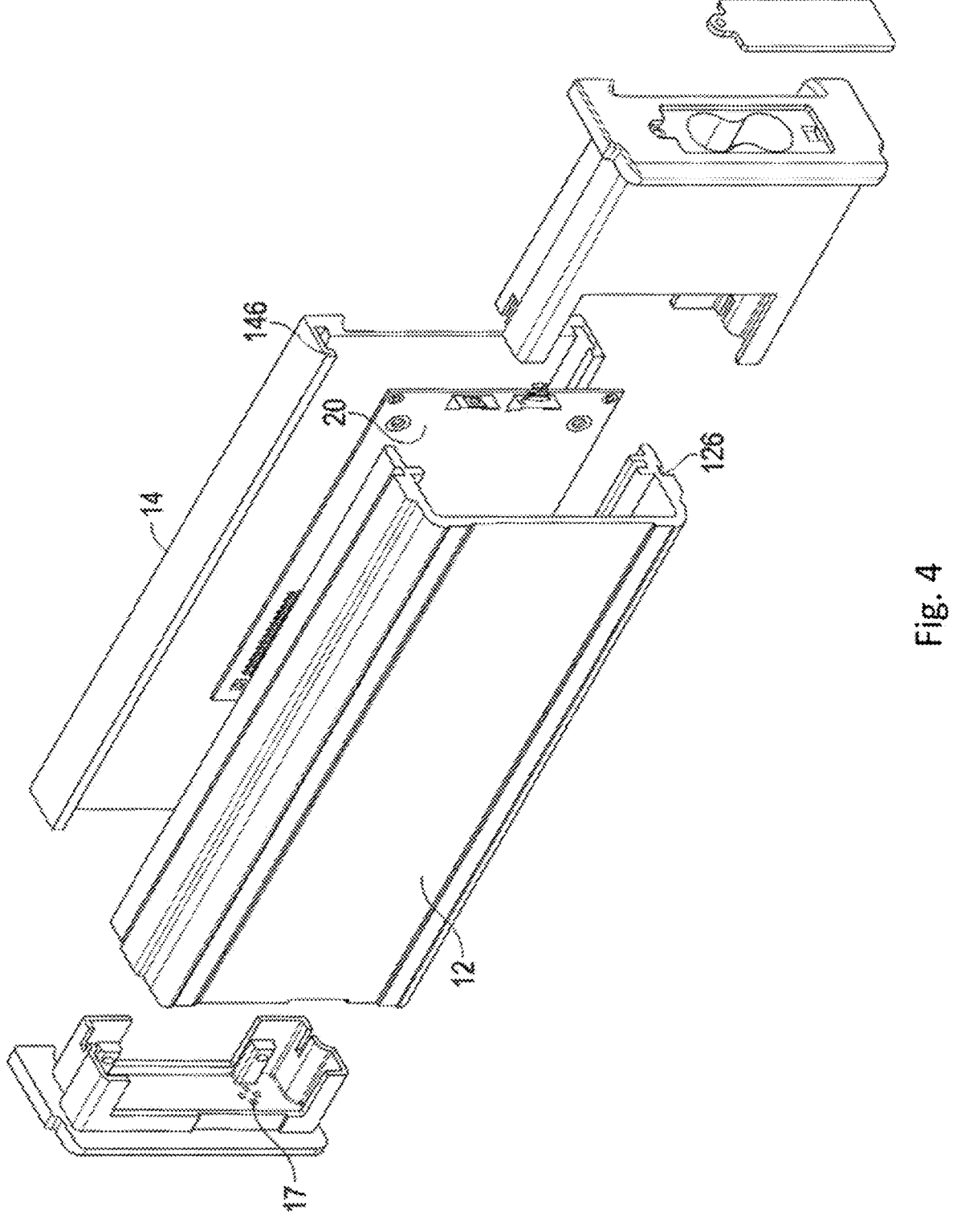
FIG. 4 is an exploded front perspective view of an embodiment of the present invention.
Figure 5:
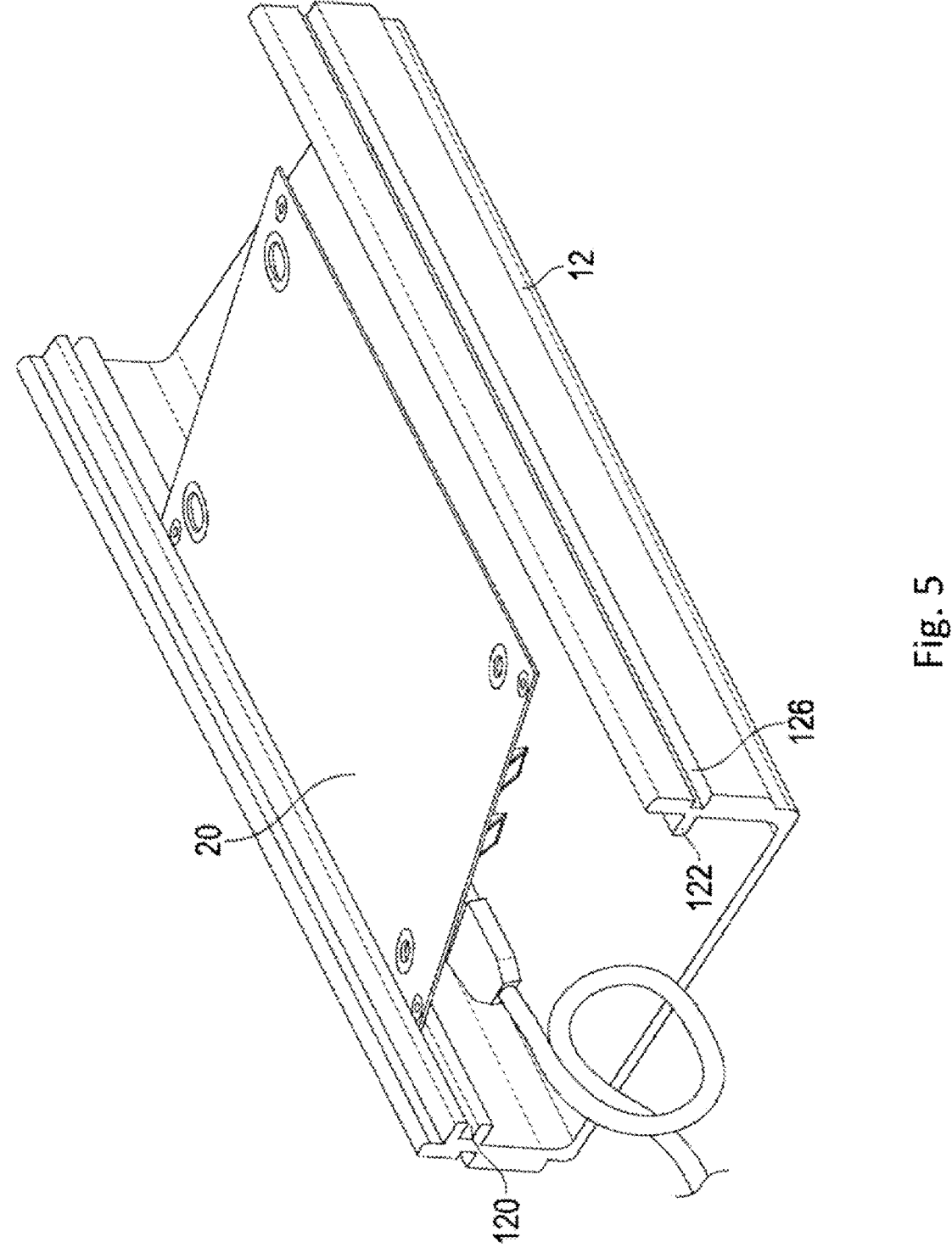
FIG. 5 is a perspective view of a first longitudinal edge of a PCB engaged with a longitudinal slot of a front shell of an embodiment of the present invention.
Figures 6, 7:
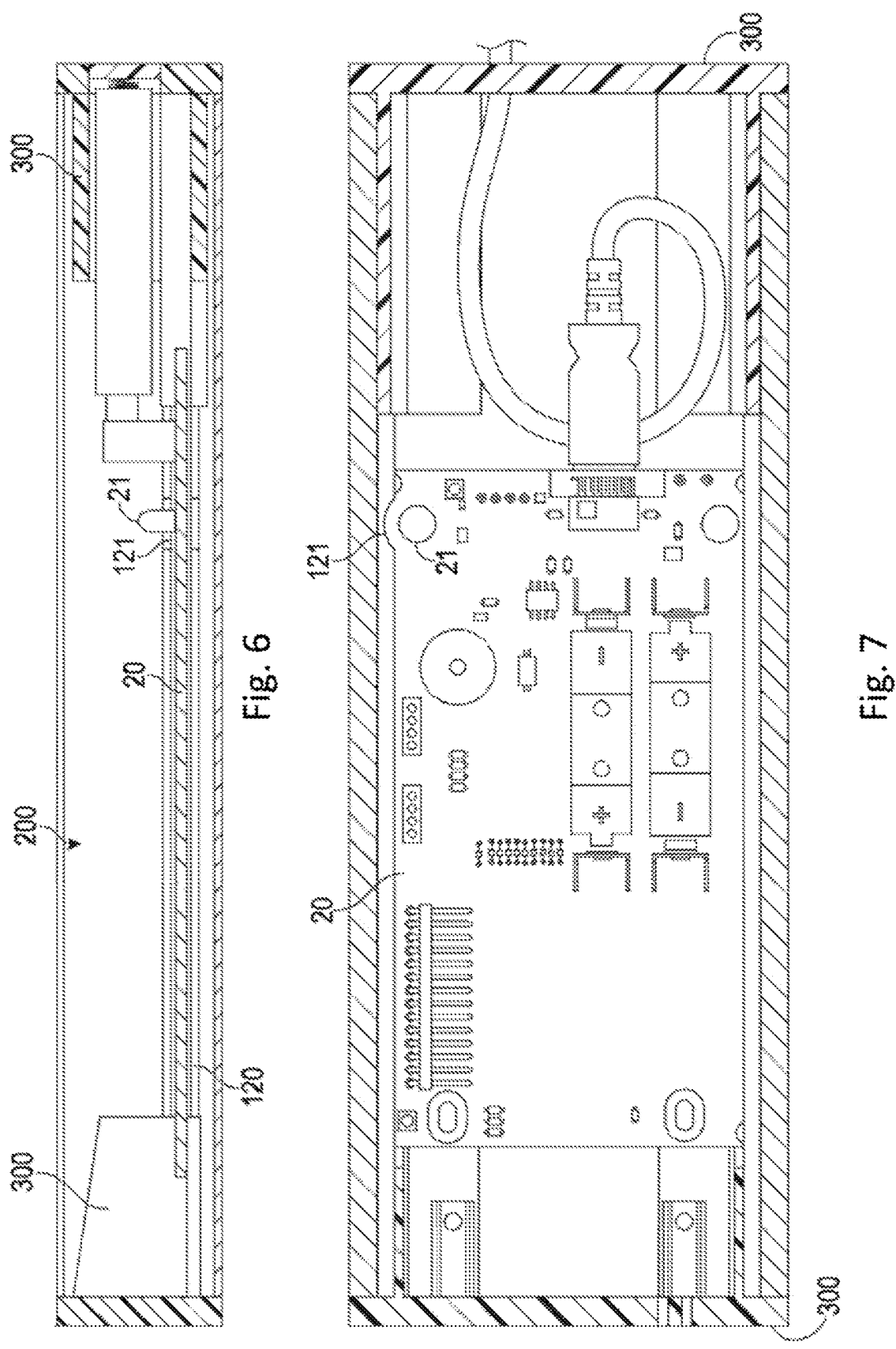
FIG. 6 is a sectional view showing a PCB engaged with end caps of an embodiment of the present invention.
FIG. 7 is a sectional view showing an indexing feature of a PCB engaged with an indexing feature of a front shell of an embodiment of the present invention.
Figure 8:
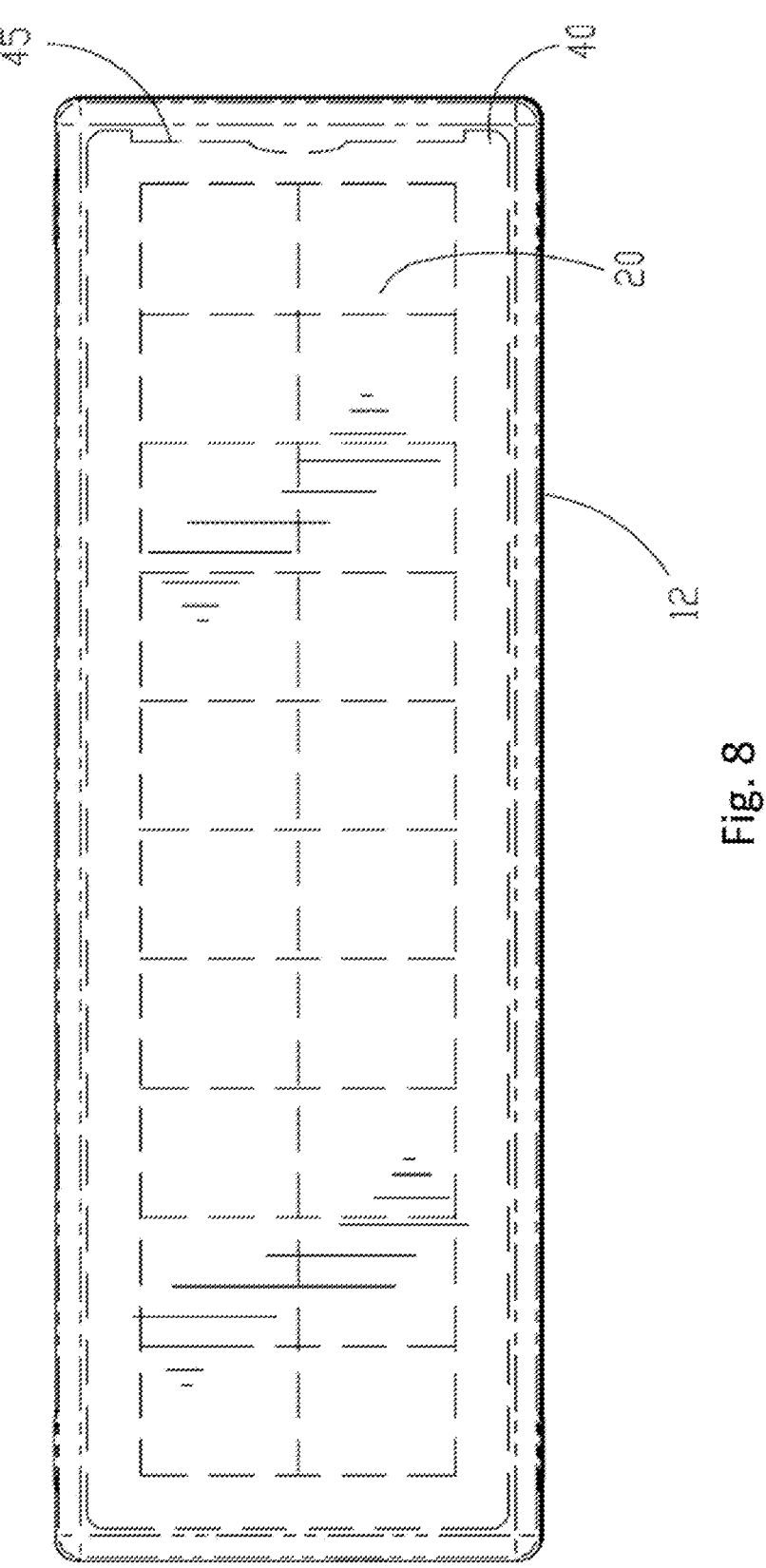
FIG. 8 is a front view of a keyboard enclosure of an embodiment of the present invention with a keyboard overlay positioned on a front surface of the enclosure.

Referring to FIG. 5, some embodiments of the first shell 12 define a longitudinal slot 120 and an opposed longitudinal ledge 122. In some such embodiments, the opposed slot 120 and ledge 122 are configured to interface with opposed first and second longitudinal edges of a PCB 20, respectively. In this way, the first longitudinal edge of the PCB 20 is capable of selective engagement with the longitudinal slot 120, thereby allowing the second longitudinal edge of the PCB 20 to be rotated into selective engagement with the longitudinal ledge 122. In some such embodiments, the first shell 12 includes one or more indexing feature 121, such as a notch, associated with one or more indexing feature 21 of the PCB 20, such as a light emitting diode, a speaker, or other feature of, extending from, or engaging with the PCB 20. In this way, the PCB 20 can be positioned longitudinally relative to the first shell 12 prior to rotating the PCB into position. In some embodiments, one or more feature of the enclosure 10 is configured to selectively prevent the PCB from sliding along the longitudinal slot 120 and/or from rotating away from the longitudinal ledge 122. In some such embodiments, the rear shell 14 includes a longitudinal ledge (not shown) that is configured to selectively engage with the second edge of the PCB 20 so as to prevent the PCB from rotating away from the longitudinal ledge 122 of the first shell 12. In this way, the PCB is at least partially secured within the interior cavity 200 of the enclosure 10 when the rear shell 14 is secured to the front shell 12.

In some embodiments, a first end cap 300 is configured to extend into the interior cavity 200 of the enclosure 10 when the first end cap 300 is secured to a first end of the enclosure 10. In some such embodiments, a distal end of the first end cap 300 defines one or more slot 320 for selective engagement with a first end of the PCB 20. In this way, the first end cap 300 is capable of preventing or otherwise inhibiting the PCB from moving longitudinally towards the first end of the enclosure 10. In some such embodiments, a distal end of a second end cap 300 is configured to selectively engage with a second end of the PCB 20 so as to similarly prevent or otherwise inhibit the PCB from moving longitudinally towards a second end of the enclosure 10. In other such embodiments, one or more feature of the front 12 or rear 14 shell and/or one or more other feature of the enclosure 10, first end cap 300, and/or PCB 20 is configured to prevent or otherwise inhibit the PCB 20 from moving longitudinally towards the second end of the enclosure 10. In some embodiments, one or more end cap 300 is configured to selectively prevent the PCB 20 from translating laterally and/or vertically and/or from rotating, such as rotating relative to a longitudinal axis of the keyboard enclosure 10.

In some embodiments the front shell 12 defines opposed grooves 126 and the rear shell 14 defines corresponding opposed tongues 146 that are configured for selective engagement with respective grooves 126 of the front shell 12. In this way, the keyboard enclosure 10 is moveable from a disassembled configuration to an assembled configuration by inserting a first end of the tongues 146 into a second end of the grooves 126 and moveable between an open configuration and a closed configuration by sliding the front 12 and rear 14 shells relative to each other. In some such embodiments, the shells are configured to slide relative to each other while a PCB 20 is positioned therebetween, thereby allowing for selectively enclosing the PCB 20 within the interior cavity 200 of the keyboard enclosure 10 and/or selectively removing the PCB 20 from the interior cavity 200 of the keyboard enclosure 10. It will be appreciated that in other embodiments the front shell 12 defines opposed tongues and the rear shell defines opposed grooves and/or the front 12 and/or rear 14 shells define other corresponding features for facilitating selective engagement of the front 12 and rear 14 shells. In some such embodiments, the closed configuration of the enclosure 10 defines one or more open end, one or more such open end being configured to receive an end cap 300. In other such embodiments, moving the enclosure 10 to the closed configuration includes moving a first end of the rear shell 14 into selective engagement with a first end cap 300 secured to a first end of the front shell 12 and/or moving a second end of the front shell 12 into selective engagement with a second end cap 300 secured to a second end of the rear shell 14.

In some embodiments, at least one end cap 300 is a cable end cap defining a slot for selectively receiving a cable, thereby allowing the cable to extend into the interior cavity 200 of the keyboard enclosure 10. In this way, the PCB 20 is capable of being in electrical and/or data communication with an outside source, such as a power grid and/or a computer system. In some embodiments, the cable end cap defines one or more feature, such as an S-channel, for selectively securing the cable, thereby preventing or otherwise inhibiting the cable from disconnecting from the PCB 20 and/or otherwise damaging the PCB. In some embodiments, the cable end cap defines a large void for receiving one or more loop of the cable, thereby providing slack so as to eliminate or otherwise reduce risk of damage to the PCB 20 and/or disconnection of the cable from the PCB 20.

In some embodiments, the PCB 20 is capable of wireless data communication with one or more data source, thereby eliminating the need for a data cable. In some such embodiments, the PCB 20 includes one or more battery terminal, thereby eliminating the need for a power cable. In some embodiments, the PCB is configured such that the enclosure 10 must be in the open or disassembled configuration to remove, install, and/or replace batteries. In other embodiments, one or more end cap 300 is a battery end cap that is configured to receive one or more battery, thereby allowing one or more battery to extend towards the PCB 20 for selective engagement with one or more respective battery terminal. In some embodiments, batteries are removable by removing the battery end cap while the enclosure 10 is in the closed configuration. In some such embodiments, the battery end cap includes a battery door that is moveable from an open configuration and a closed configuration. In the open configuration, the battery door allows one or more battery to be removed from the enclosure 10, installed in the enclosure 10, and/or otherwise replaced. In the closed configuration, the battery door retains the batteries relative to respective battery terminals of the PCB 20, thereby facilitating electrical communication with the PCB 20.

In some embodiments, the battery end cap is configured to selectively engage a first portion of each battery, with a second portion of each battery extending freely from the battery end cap towards respective battery terminals of the PCB 20. In this way, the battery end cap provides sufficient structure to position and align each battery with its respective battery terminal while eliminating or otherwise reducing the risk of one or more battery becoming lodged within the battery end cap. In some such embodiments, the first portion of the battery is two-thirds of the overall length of the battery.

In some embodiments, a front surface of the front shell 12 defines a recessed area 18 that is configured to receive a keypad 30. In some such embodiments, opposed longitudinal edges of the recessed area 18 are configured to interface with opposed longitudinal edges of the keypad 30, thereby preventing or otherwise inhibiting the keypad 30 from translating in a lateral direction when the keypad 30 is positioned in the recessed area 18. In some such embodiments, opposed end caps each define opposed lateral edges of the recessed area, thereby preventing or otherwise inhibiting the keypad 30 from translating in a longitudinal direction within the recessed area 18 when the end caps are engaged with the first shell 12. In other such embodiments, at least one lateral edge of the recessed area 18 is defined by the front shell 12. In some embodiments, a top surface of the keypad 30 is flush with or is slightly offset below nonrecessed portion of the front surface of the front shell 12.

Figure 9:
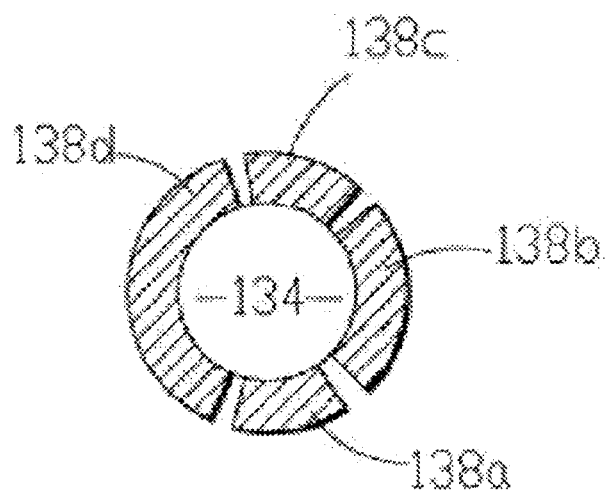
FIG. 9 is a front view of a button for a keypad membrane of one preferred embodiment of the instant invention in which multiple leads of different dimensions are utilized on the front side of each button.
Figures 11, 12:
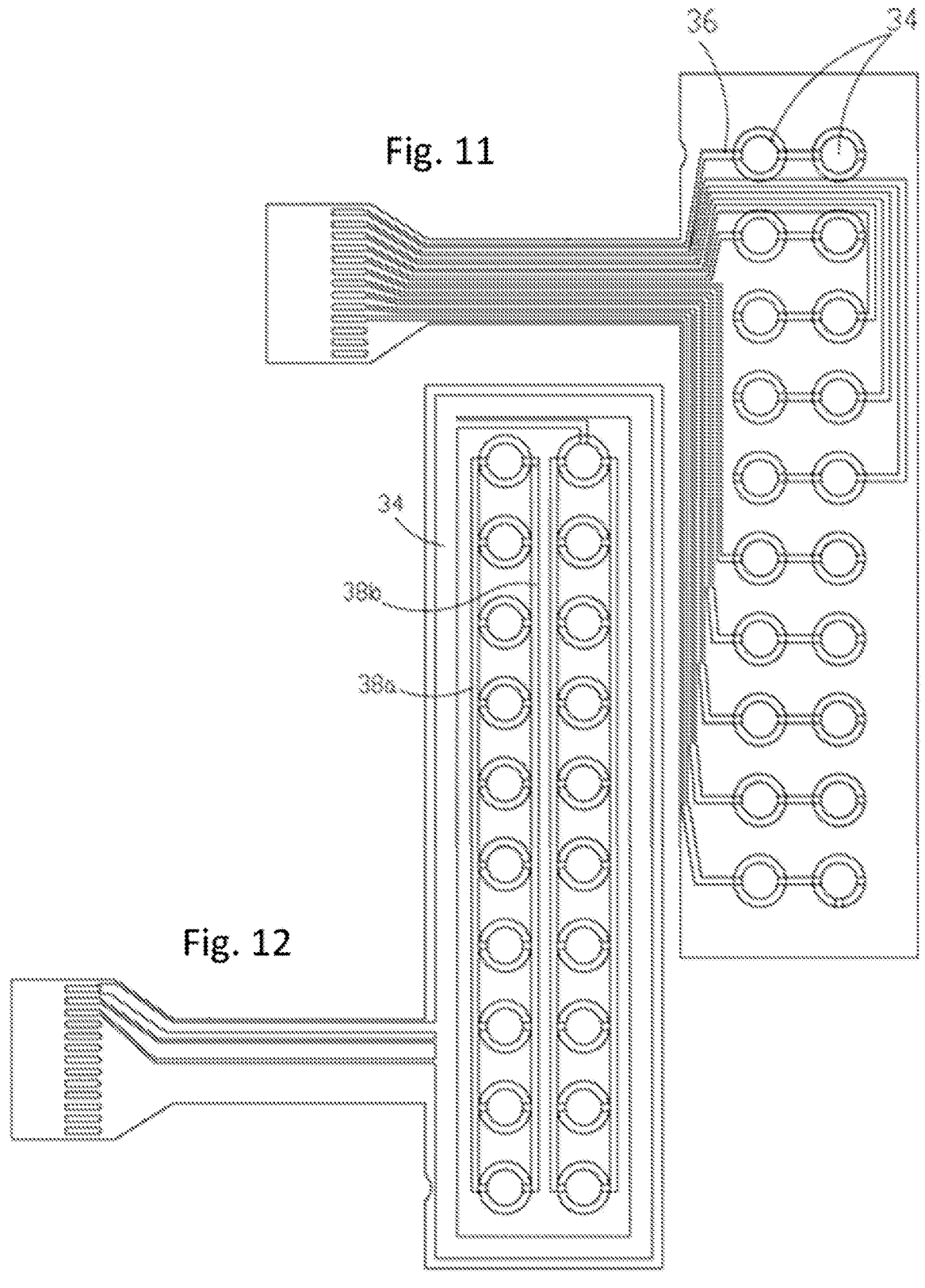
FIGS. 11 and 12 are rear and front, respectively, plan views of a keypad membrane of an embodiment of the instant invention in which two parallel front leads are connected to each button/switch.
Figure 13:
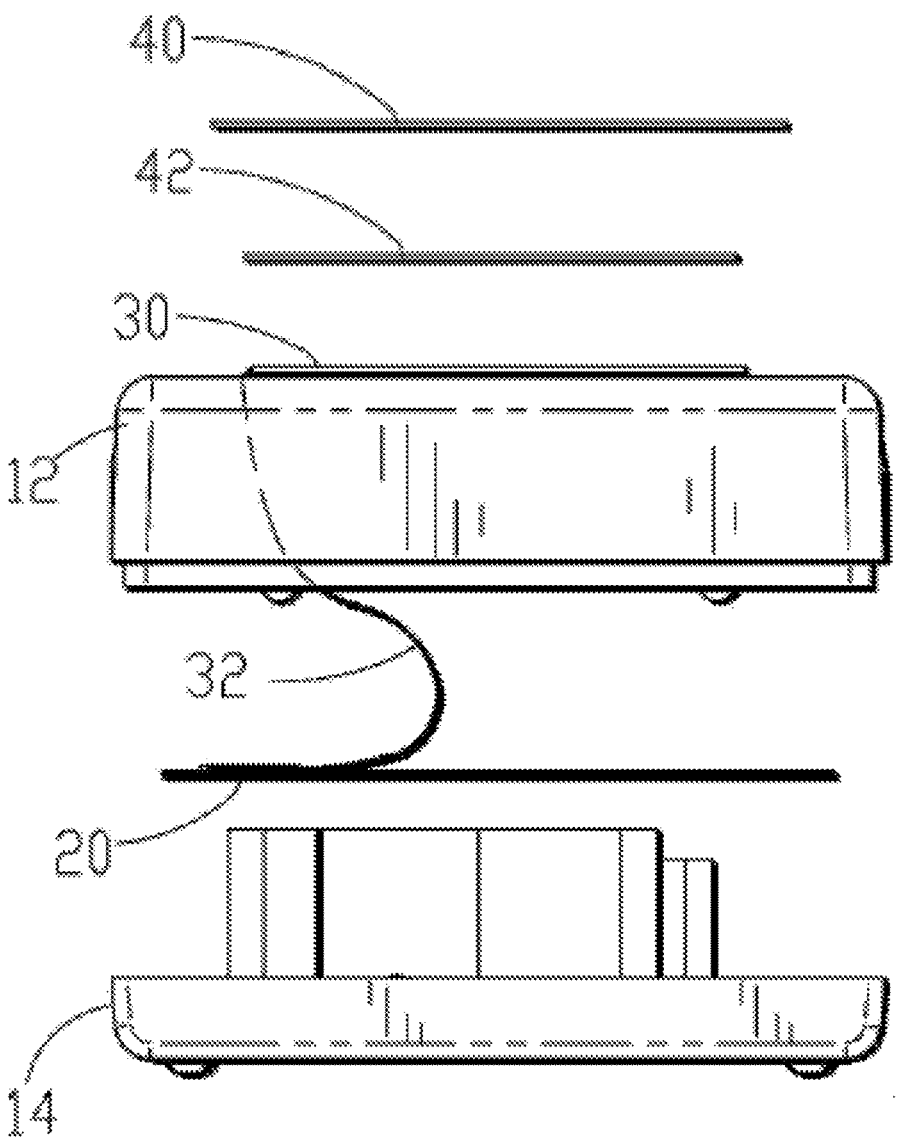
FIG. 13 is an exploded view of an embodiment of the present invention.

In some embodiments, the keypad 30 includes embossed buttons for each key, instead of metal domes. In some embodiments, the buttons are connected together in parallel and each button includes at least two front side leads. FIGS. 11 and 12 show an embodiment of the instant invention that includes two front side leads 38*a* and 38*b* to each button 34. In the embodiment shown in FIGS. 11 and 12, only a single back side lead 36 is connected to each button 34 (see FIG. 11); however it will be appreciated that a plurality of leads may also be connected to the back side without departing from the spirit and scope of the instant invention. Referring to FIG. 9 another embodiment of the instant invention is shown in which four front side leads 138*a*, 138*b*, 138*c* and 138*d* are connected to each button 134. In the embodiment shown in FIG. 9, each front side lead for each button includes connection sections of four varying dimensions to create four different resistances during flexing caused by pressing of the buttons. This results in decreased wear on the connections.

In some embodiments, the keyboard 30 includes twenty (20) distinct keys. In some such embodiments, keys of the twenty-key keyboard are oriented in a 2 by 10 configuration and are in data communication with thirteen (13) distinct pins of a pin header of the PCB 20. In other embodiments, the keyboard 30 includes thirty (30) distinct keys. In some such embodiments, keys of the thirty-key keyboard are oriented in a 3 by 10 configuration and are in data communication with fourteen (14) distinct pins of a pin header of the PCB 20. In some embodiments, the PCB 20 is configured to selectively accommodate a twenty-key or a thirty-key keyboard by selectively accommodating a thirteen-pin or a fourteen-pin receptacle of the keyboard, respectively.

Figure 10:
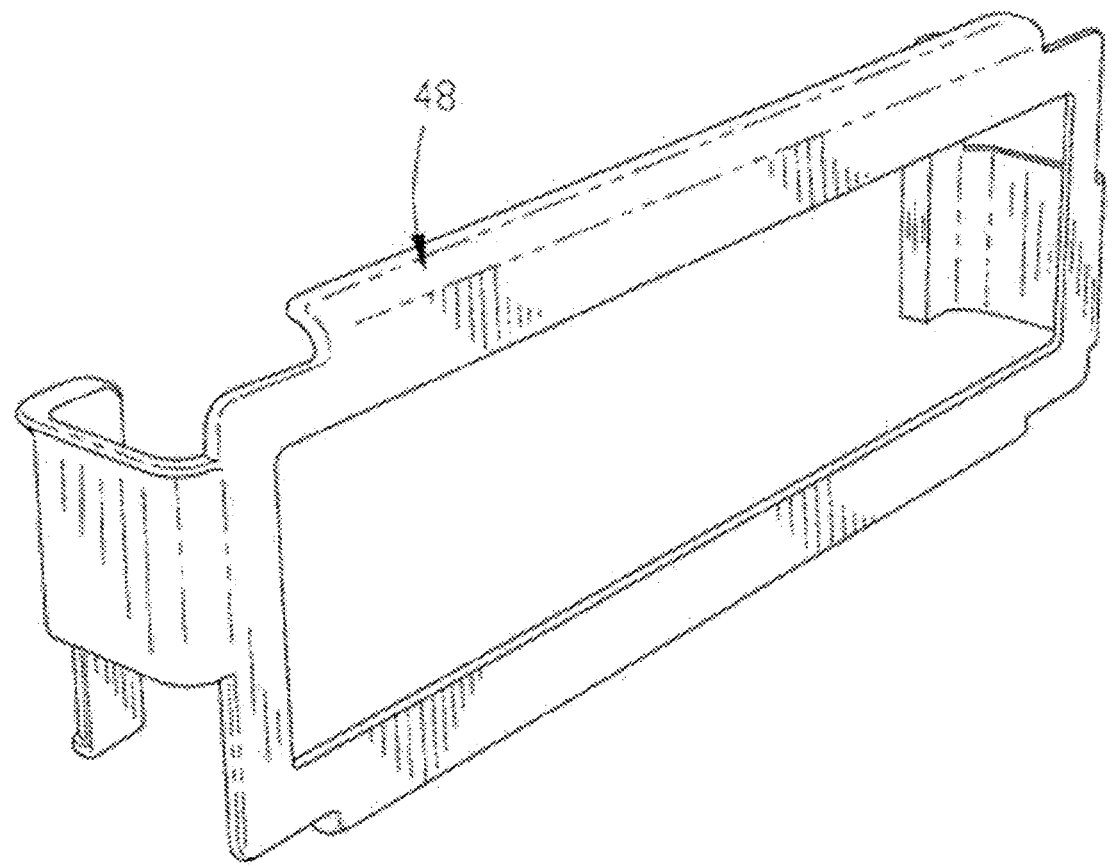
FIG. 10 is a front perspective view of a keypad cover for a keyboard enclosure of an embodiment of the present invention.

In some embodiments, the keypad membrane 30 is covered by a cover membrane 40. In some such embodiments, the cover membrane 40 includes one or more clear window section. The edges of the cover membrane 40 are secured to the front surface of front shell 12 and includes an open slot 45 to allow a keypad card 42 to be moved to (or away from) a first position by inserting (or removing) the keypad card 42 between the rear of the cover membrane 40 and the front of the keypad membrane 30 while the keypad membrane 30 is in a respective first position. In some embodiments, the keyboard is configured to retain the keypad membrane 30 in its first position while one or more keypad card 42 is moved between its first position and a second position. In some embodiments, moving the keypad card 42 to its second position comprises moving the keypad card 42 away from the keyboard, such as by sliding the keypad card 42 through the open slot 45 and away from the keypad membrane 30. In some embodiments, the cover membrane 40 is configured to selectively receive one or more keypad card 42, positioning the keypad card 42 relative to the keypad 30. In some embodiments, the keypad card 42 includes numbers, symbols, words, etc. that associate with the function that is to be performed by the pressing of a key. In one embodiment, a keypad cover 48 (shown in FIG. 10 selectively engages with the keyboard enclosure 10 once the entire enclosure 10, keypad 30, and cover membrane 40 are assembled. In some embodiments, the keypad cover 48 is made of a polymer material that includes enough flexibility to allow the keypad cover 48 to snap around the assembled keyboard enclosure 10. The keypad cover helps to protect the keypad 30 and the keyboard enclosure 10 and also allows the keyboard enclosure 10 to fit within a variety of different mounting brackets, such as those that are commonly used in the restaurant industry.

The present invention further includes methods of assembling a keyboard enclosure 10. In some embodiments, the method includes moving a first longitudinal edge of a PCB 20 into selective engagement with a longitudinal slot 120 of a front shell 12 of the enclosure 10, thereby restraining the PCB 20 in a first degree of translational freedom, a first degree of rotational freedom, and a first direction along a second degree of translational freedom. In some such embodiments, the method further includes positioning an indexing feature of the PCB relative to an indexing feature of the enclosure. In this way, the method includes positioning the PCB along a third degree of translational freedom, thereby providing positional references along each of the three translational degrees of freedom. In some embodiments, the respective indexing features restrain the PCB along the third degree of freedom while the first longitudinal edge of the PCB 20 is engaged with the longitudinal slot 120 of the front shell 12. In other embodiments, one or more other feature, such as one or more feature of the front 12 or rear 14 shell and/or one or more feature of one or more end cap is utilized to position and/or restrain the PCB along the third degree of translational freedom. In some embodiments, the indexing feature is defined by one or more slot 320 defined by one or more end cap 300.

The method further includes installing a rear shell 14 to the front shell 12. In some embodiments, a second longitudinal edge of the PCB 20 is rotated towards a longitudinal ledge 122 of the front shell 12 prior to installing the rear shell 14 to the front shell 12. In some such embodiments, a longitudinal ledge of the rear shell 14 retains the second longitudinal edge of the PCB 20 in close proximity to the longitudinal ledge 122 of the front shell 12, thereby restraining the PCB in a second degree of rotational freedom. In some embodiments, the front 12 and rear 14 shells form a second longitudinal slot between respective longitudinal ledges, thereby restraining the PCB in a second and third degree of rotational freedom and further restraining the PCB in a second direction along the second degree of translational freedom. In other embodiments, one or more end cap 300 engages with one or more end of the PCB 20 so as to inhibit or otherwise prevent the PCB 20 from moving relative to the front shell 20 in the first, second, and/or third degrees of translational and/or rotational freedom.

In some embodiments, the method of assembling the keyboard enclosure 10 includes engaging opposed tongues 146 of the rear shell 14 with corresponding opposed grooves 126 of the front shell 12 and sliding the rear shell 14 relative to the front shell 12 until a first end of the rear shell 14 is aligned with a first end of the front shell 12, thereby moving the enclosure 10 to a closed configuration. In some embodiments, a first end cap 300 secured to the first end of the front shell 12 provides a stop for preventing the first end of the rear shell 14 from sliding beyond the first end of the front shell 12. In some embodiments, a first end cap 300 is secured to the rear shell 14, such as with screws extending through a rear wall of the rear shell 14. In other embodiments, a first end cap 300 is secured to the front shell 12, such as with screws extending through a side wall of the front shell 12. In still other embodiments, the first end cap 300 is secured to the front 12 and rear 14 shells, such as with screws extending through respective side walls of the front 12 and rear 14 shells and/or through respective front, side, and/or rear walls of respective shells.

In some embodiments, the method of assembling the keyboard enclosure 10 includes engaging a first end of the rear shell 14 with a second end of the front shell 12 and sliding the shells relative to each other until one or more end of each shell is moved into a predetermined position relative to the other shell, such as by aligning respective first and/or second ends of respective shells. In some embodiments, a second end cap 300 secured to the second end of the rear shell 14 provides a stop for preventing the second end of the front shell 12 from sliding beyond the second end of the rear shell 14. In some such embodiments, the second end cap 300 is secured to the rear shell, such as with screws extending through a rear or side wall of the rear shell 14. In some embodiments, a second end cap 300 is further secured to the front shell 12, such as with screws extending through a front or side wall of the front shell 12, thereby locking the front 12 and rear 14 shells into relative position with each other. Mounting System—Shelf Bracket In some embodiments, the keyboard assembly includes a shelf bracket 500 for supporting an enclosure 10, the shelf bracket 500 comprises a shelf member 510 for providing vertical support for the enclosure. In some embodiments, the shelf member is cantilevered from a back plate 530, such as a back plate 530 that is configured to prevent or otherwise inhibit movement of the enclosure in an aft direction. In some embodiments, the shelf bracket 500 comprises a support flange 535 extending from the back plate 530 of the shelf bracket, at least one of the support flange 535 and the back plate 530 being configured to engage with a support structure so as to provide support for the shelf bracket. In some embodiments, the shelf member 510 extends in a first direction from a first edge of the back plate 530 and the support flange 530 extends in a second direction from a second edge of the back plate 530, the first and second edges of the back plate 530 being opposed to each other and the first and second directions being diametrically opposed to each other.

In some embodiments, the shelf bracket 500 includes one or more side flange 520, such as a side flange extending from a back plate of the shelf bracket, each side flange being configured to prevent or otherwise inhibit movement of the enclosure in a respective lateral direction. In some embodiments, the shelf bracket 500 includes one or more front flange 525, such as a front flange extending from a respective side flange of the shelf bracket, each front flange being configured to prevent or otherwise inhibit movement of the enclosure in a respective lateral direction. In some embodiments, the shelf member defines a cavity that is configured to receive an enclosure, such as by moving the enclosure in a vertical direction in and out of engagement with the cavity.

In some embodiments, one or more plate, flange, or other feature of the shelf bracket prevents or otherwise inhibits movement of the enclosure in one or more respective lateral direction without inhibiting movement of the enclosure in a vertical direction, thereby facilitating movement of the enclosure in and out of a cavity of the shelf bracket. In some embodiments, the shelf bracket comprises a shelf member defining a bottom limit of the cavity such that movement of the enclosure into the cavity is limited to a first vertical direction and movement of the enclosure out of the cavity is limited to a second vertical direction, the second vertical direction being diametrically opposed to the first vertical direction.

Mounting System—Expandable Bracket

Referring to FIG. 20, in some embodiments, an expandable bracket 400 is included. In some embodiments, the expandable bracket 400 is intended to secure a keyboard enclosure in position relative to a wall or other structure, thereby providing a support mechanism for the enclosure. In some embodiments, the expandable bracket 400 attaches to an enclosure, such as by way of attaching to a rear shell 14 of the enclosure. In some embodiments, a mounting element, such as a back plate 430, defines one or more attachment feature, such as a plurality of apertures 440, for securing the Expandable Bracket 400 to a wall or other support structure, such as by extending a screw or other fastening means through the attachment feature and into the support structure. It will be appreciated that in other embodiments the expandable bracket 400 is secured to the support structure using one or more other means now known or later developed.

The expandable bracket 400 includes opposed legs 410, 420 having opposed proximal and distal ends, the proximal end of each leg 410, 420 being coupled to respective opposed edges of the back plate 430 of the Expandable Bracket 400 such that the back plate 430 and the opposed legs 410, 420, together, define a channel. In some embodiments, the distal end of each leg 410, 420 defines a flange or other engagement feature 412, 422, such engagement features 412, 422 being configured to selectively engage with an engagement mechanism of the enclosure, such as by way of engaging with a respective lip or other respective engagement feature of the engagement mechanism. In some embodiments, the engagement mechanism coupled to, defined by, or otherwise associated with a rear shell 14 of an enclosure.

In some embodiments the Expandable Bracket 400 includes one or more biasing assembly 450 for biasing the distal ends of the opposed legs 410, 420 away from each other, thereby biasing the engagement features 412, 422 of each leg 410, 420 into engagement with a respective engagement feature of the enclosure. In this way, the Expandable Bracket 400 can be expanded into engagement with the enclosure, thereby moving the keyboard assembly to a secured configuration.

In some embodiments, the biasing assembly includes a biasing member 452, such as a screw or a bolt. In some embodiments, the biasing member 452 engages with a first leg 410 of the opposed legs of the Expandable Bracket 400, such as a by engaging with a fixed member 454 of the biasing assembly 450. It will be appreciated that certain embodiments of the fixed member 454 comprise and/or define a threaded aperture 414 defined by the first leg 410, a threaded insert extending through an aperture 414 of the first leg 410, a nut or other threaded item 454 coupled to the first leg 410, and/or the like. It will be appreciated that in some embodiments the biasing member 452 defines external threads and the fixed member 454 defines corresponding internal threads such that rotating the biasing member relative to the fixed member causes biasing member to move between deployed and retracted configurations. In some embodiments, the fixed member 454 is positioned against an inner surface of the first leg 410. In some embodiments, a distal end of the biasing member 452 engages with an inner surface of a second leg 420 of the opposed legs of the Expandable Bracket 400 when the biasing member is in the deployed configuration. In some embodiments, the distal end of the biasing member 452 is configured to engage with a recessed area 426 of the inner surface of the second leg 420. In some such embodiments, an outer surface of the second leg 420 defines one or more boss such that the inner surface of the second leg 420 defines one or more respective recessed area 426. In other such embodiments, the second leg 420 defines a first thickness at the center of the recessed area 426 and a second thickness adjacent to the recessed area 426, the second thickness being greater than the first thickness.

In some embodiments, the biasing member 452 extends through a first leg 410 towards a second leg 420 with a distal end of the biasing member 452 being displaced from the second leg 420 when the biasing member 452 is in a retracted configuration. In some embodiments, moving the biasing member 452 from the retracted configuration towards the deployed configuration comprises moving the distal end of the biasing member 452 into engagement with the second leg 420, such as by twisting a screw or a bolt. In some embodiments, the biasing member 452 is configured to expand the expandable bracket 400 by continuing to move the biasing member 452 away from its disengaged configuration while the biasing member 452 is in the deployed configuration, thereby moving the bracket 400 from a relaxed configuration to an expanded configuration. In this way, the biasing member 452 is configured to bias the opposed legs 410, 420 of the Expandable Bracket 400 away from each other, thereby expanding distal ends of the legs 410, 420 into engagement with a rear shell 14 of an enclosure so as to move the keyboard assembly from an unsecured configuration to a secured configuration.

It will be appreciated that in some embodiments moving the biasing member 452 to its retracted configuration enables the opposed legs 410, 420 to move towards each other, thereby moving the keyboard assembly from the secured configuration to the unsecured configuration. In this way, the enclosure can be moved between engaged and disengaged configurations relative to the bracket. In some embodiments, the enclosure is prevented or otherwise inhibited from moving away from the engaged configuration when the keyboard assembly is in the secured configuration. In some embodiments, the bracket is moveable from the relaxed configuration to a contracted configuration, such as by biasing the distal ends of the first and second legs towards each other, thereby facilitating movement of the enclosure in and out of engagement with the bracket.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

The invention claimed is:

1. A keyboard assembly comprising:
a front shell portion;
a rear shell portion removably connected to said front shell portion so as to form a cavity;
a circuit board ("PCB") positioned within said cavity, said PCB being displaced from a first end of said front shell portion; and
two opposing legs each engaged with said rear shell portion along their distal edges, said legs connected via a proximal edge to a back plate.

2. The keyboard assembly of claim 1, wherein the distance between the distal edges of said opposing legs is less than the width of the back plate.

3. The keyboard assembly of claim 1, further comprising a biasing member interacting with at least one of said two opposing legs.

4. The keyboard assembly of claim 3, wherein said interaction occurs via one or more securing element associated with at least one of said opposing legs.

5. The keyboard assembly of claim 3, wherein said opposing legs are configured in either an engaged or disengaged configuration depending on the positioning of said biasing member.

6. The keyboard assembly of claim 5, wherein said opposing legs are considered to be in an engaged configuration when said biasing member interacts with both of said opposing legs.

7. The keyboard assembly of claim 1, wherein the front shell portion defines a first longitudinal slot positioned within the cavity, wherein the first longitudinal slot is configured to selectively receive a first longitudinal edge of the PCB, thereby restraining the PCB in at least one degree of translational freedom, at least one degree of rotational freedom, and a first direction along a second degree of translational freedom.

8. The keyboard assembly of claim 1, further comprising a keypad cover having flexible side members that snap fit around said front shell portion and said rear shell portion.

9. The keyboard assembly of claim 1, further comprising:
a slot extending into the cavity;
wherein the slot is configured to receive a ribbon cable extending from the PCB to a keypad selectively positioned in a first position over a generally flat and substantially solid front surface of said front shell portion.

10. The keyboard assembly of claim 1,
wherein the front shell portion defines:
a first longitudinal slot positioned within the cavity; and
a longitudinal ledge opposed to the first longitudinal slot;
wherein the first longitudinal slot is configured to selectively receive a first longitudinal edge of the PCB when a second longitudinal edge of the PCB is rotated away from the longitudinal ledge, and
wherein the front shell portion is configured to restrain the PCB in at least two degrees of translational freedom and at least two degree of rotational freedom when the second longitudinal edge of the PCB is positioned adjacent to the longitudinal ledge of the front shell portion.

11. A method for assembling a keyboard enclosure, the method including:
moving a first longitudinal edge of a PCB into selective engagement with a longitudinal slot of a front shell of the enclosure;
positioning an indexing feature of the PCB relative to an indexing feature of the enclosure; and
installing a rear shell to the front shell.

12. The method of claim 11, further comprising the step of engaging opposed tongues of the rear shell with corresponding opposed grooves of the front shell and sliding the rear shell relative to the front shell until a first end of the rear shell is aligned with a first end of the front shell.

13. The method of claim 11, further comprising the step of securing a first end cap to a first end of the rear shell.

14. The method of claim 13, further comprising the step of securing a second end cap to a second end of the rear shell, wherein said second end cap is configured to prevent the second end of the front shell from sliding beyond the second end of the rear shell.

15. The method of claim 13, wherein said first end cap is secured to said rear shell with screws extending through a rear wall of the rear shell.

16. The method of claim 13, further comprising the step of securing a first end cap to the front shell.

17. The method of claim 16, wherein said first end cap is secured to said front shell with screws extending through a side wall of the front shell.

18. The method of claim 11, further comprising the step of engaging a first end of the rear shell with a second end of the front shell and sliding the shells relative to each other until one or more end of each shell is moved into a predetermined position relative to the other shell.

19. The method of claim 11, further including the step of restraining the PCB in a first degree of translational freedom, a first degree of rotational freedom, and a first direction along a second degree of translational freedom.

20. The method of claim 19, further including the step of positioning the PCB along a third degree of translational freedom, thereby providing positional references along each of the three translational degrees of freedom.

* * * * *